United States Patent [19]

Sakaegi et al.

[11] Patent Number: 5,469,218
[45] Date of Patent: Nov. 21, 1995

[54] IMAGE SIGNAL PROCESSING DEVICE WITH CONVERSION OF SAMPLE FREQUENCY OF DIGITAL COLOR-DIFFERENCE DATA SIGNALS

[75] Inventors: Yuji Sakaegi; Eiji Ohara, both of Kanagawa, Japan

[73] Assignee: Canon Kabushiki Kaisha, Tokyo, Japan

[21] Appl. No.: 916,590

[22] Filed: Jul. 20, 1992

[30] Foreign Application Priority Data

Jul. 23, 1991 [JP] Japan ................................. 3-206276
Nov. 21, 1991 [JP] Japan ................................. 3-306236
Mar. 10, 1992 [JP] Japan ................................. 4-051716

[51] Int. Cl.⁶ .................................................. H04N 11/22
[52] U.S. Cl. ............................................ 348/455; 348/504
[58] Field of Search ................................... 358/17, 11, 14; 348/491, 503, 504, 455; H04N 11/18, 11/22

[56] References Cited

U.S. PATENT DOCUMENTS 4,117,509  9/1978  de Boer ................................. 358/14
5,093,714  3/1992  Hashimoto ........................... 358/11
5,245,415  9/1993  Mimura ................................ 358/14

FOREIGN PATENT DOCUMENTS 0304254  2/1989  European Pat. Off. ....... H04N 11/22

Primary Examiner—James J. Groody
Assistant Examiner—Jeffrey S. Murrell
Attorney, Agent, or Firm—Robin, Blecker, Daley & Driscoll

[57] ABSTRACT

An image signal processing device according to this invention is a device for processing an image signal. The device is arranged to input digital data corresponding to two kinds of color-difference signals in synchronism with a clock signal corresponding to a data rate of the digital data, reconstruct the inputted digital data corresponding to the two kinds of color-difference signals into digital data synchronized with a clock signal having a frequency which is an integer multiple of a color subcarrier frequency, and form digital data corresponding to a chrominance signal by using the reconstructed digital data corresponding to the two kinds of color-difference signals. Accordingly, it is possible to stably encode the two kinds of color-difference signals into the carrier chrominance signal by means of a simple construction without degrading the color-difference signals.

9 Claims, 23 Drawing Sheets

IMAGE SIGNAL PROCESSING DEVICE WITH CONVERSION OF SAMPLE FREQUENCY OF DIGITAL COLOR-DIFFERENCE DATA SIGNALS

BACKGROUND OF THE INVENTION

1. Field of the Invention

The present invention relates to an image signal processing device for processing an image signal.

2. Description of the Related Art

In the field of image signal processing devices, an image signal processing device has heretofore been known which is arranged to form a carrier chrominance signal by performing quadrature two-phase modulation of two kinds of color-difference signals R–Y and B–Y.

In general, such an image signal processing device is arranged to form the carrier chrominance signal by performing quadrature two-phase modulation of two kinds of analog color-difference signals R–Y and B–Y by means of a balanced-modulation circuit or the like.

In one recent type of image signal processing device, two kinds of analog color-difference signals R–Y and B–Y are each digitized at a sampling frequency which is an integer multiple (for example, four times) of a color subcarrier frequency, and the obtained two kinds of digital color-difference signals R–Y and B–Y are arranged in alternate sequence, for example, as shown in FIG. 1. A carrier chrominance signal is formed from the two kinds of digital color-difference signals R–Y and B–Y by using a digital color encoder for forming a quadrature two-phase modulated carrier chrominance signal by inverting, as shown in FIG. 1, the polarities of the two kinds of digital color-difference signals R–Y and B–Y in a predetermined alternate manner according to whether the NTSC television system or the PAL television system is used as a television signal system.

However, the former arrangement for encoding two kinds of analog color-difference signals R–Y and B–Y into a carrier chrominance signal in the form of analog signals has a number of disadvantages when compared to the latter arrangement for processing two kinds of color-difference signals R–Y and B–Y in the form of digital signals. For example, a carrier leak or the degradation of a carrier balance may occur in an encoded carrier chrominance signal, no good stability is attained with respect to temperature variations, and complicated adjustment is needed.

The latter arrangement for encoding two kinds of analog color-difference signals R–Y and B–Y into a carrier chrominance signal by digital processing has the disadvantage that no satisfactory versatility is attained since the sampling frequency for use in digitizing the two kinds of analog color-difference signals R–Y and B–Y must be an integer multiple of the color subcarrier frequency. If the digital color-difference signals R–Y and B–Y are signals digitized at a sampling frequency other than the integer multiple of the color subcarrier frequency, it is necessary to carry out processing according to the method illustrated in FIG. 1 after the sampling frequency for the digital color-difference signals R–Y and B–Y has been subjected to rate conversion and re-sampling of the digital color-difference signals R–Y and B–Y has been performed at a frequency which is the multiple integer (for example, four times) of the color subcarrier frequency. However, complicated processing is needed in the rate conversion for converting color-difference signals digitized at an arbitrary sampling frequency other than the integer multiple of the color subcarrier frequency into digital signals corresponding to the sampling frequency which is the integer multiple of the color subcarrier frequency. To achieve such processing, a complicated arrangement is needed and an increase in cost is incurred.

The currently used television signal systems are divided into three major systems: the NTSC television system used in Japan, North America, etc., the PAL television system used in China, Western Europe, etc., and the SECAM television system used in Eastern Europe, etc.

Each of the NTSC and PAL systems adopts a format in which a chrominance signal formed by performing quadrature two-phase modulation of a color-subcarrier-frequency signal in accordance with two kinds of color-difference signals R–Y and B–Y is multiplexed with a luminance signal (Y signal). A color subcarrier frequency fsc of the color-subcarrier-frequency signal is 3.579545 MHz in the case of the NTSC television system or 4.43361875 MHz in the case of the PAL television system.

FIG. 2 is a schematic block diagram showing the construction of a conventional signal processing device for forming a composite video signal from a luminance signal and two kinds of color-difference signals.

Referring to FIG. 2, a Y signal is digitized by an A/D converter 1Y at a predetermined sampling frequency fs, and the digitized Y signal is stored in a frame memory (Mem) 2Y. In the meantime, color-difference signals R–Y and B–Y are respectively digitized by A/D converters 1R and 1B at an arbitrary frequency synchronized with the color subcarrier frequency fsc, and the digitized color-difference signals R–Y and B–Y are stored in frame memories 2R and 2B, respectively.

In the above-described signal processing device, the color-difference signals R–Y and B–Y are digitized in the respective A/D converters 1R and 1B at a frequency synchronized with the color subcarrier frequency fsc, for example, at a frequency 2 fsc, 4 fsc, fsc or fsc/2, while the Y signal can be digitized at an arbitrary frequency. However, to make it easy to constitute a not-shown controller for controlling the read/write operation of each of the frame memories 2Y, 2R and 2B, the Y signal is also digitized in the A/D converter 1Y at a frequency synchronized with the color subcarrier frequency fsc, for example, at a frequency 4 fsc or 3 fsc.

The digital Y signal stored in the frame memory 2Y is read out and, then, converted into an analog signal by a D/A converter 4Y which operates at a sampling frequency fs. The analog signal is applied to a low-pass filter (LPF) 5Y, and a signal passed through the LPF 5Y is supplied to an adder 6 and to a buffer 7Y. The signal supplied to the buffer 7Y is outputted as a Y signal. In the meantime, the color-difference signals R–Y and B–Y stored in the respective frame memories 2R and 2B are read out and, then, balanced-modulated by a balanced modulator 3 which operates at a sampling frequency 4 fsc, thereby forming a digital chrominance signal. The digital chrominance signal is converted into an analog signal by a D/A converter 4a and the analog signal is applied to a band-pass filter (BPF) 5a, and a signal passed through the BPF 5a is supplied to the adder 6 and to a buffer 7b. The signal supplied to the buffer 7b is outputted as a chrominance signal. The adder 6 adds the luminance signal to the supplied chrominance signal, and the resultant signal is outputted from a buffer 7a as a composite video signal.

However, if the above-described conventional signal processing device is to be made adaptable to both the NTSC television system and PAL television system, there is the problem that since the color subcarrier frequencies fsc used in both systems greatly differ from each other, it is extremely difficult to arrange the signal processing device so that it can operate with a sampling clock signal of the same frequency for both the NTSC television system and PAL television system.

More specifically, if the aforesaid device is adapted to the NTSC television system, the horizontal resolution becomes approximately 500 lines when the sampling frequency fs for the Y signal is 4 fsc (=14.3 MHz), and the frame memory 2Y needs a capacity of 2.8 Mbits in the case of 8 bits per sample. On the other hand, if the aforesaid device is adapted to the PAL television system, the sampling frequency fs for the Y signal becomes 4 fsc (=17.7 MHz), the horizontal resolution becomes approximately 620 lines, and the frame memory 2Y needs a capacity of 3.5 Mbits in the case of 8 bits per sample. Accordingly, if the aforesaid device is adapted to the PAL television system, a memory of large capacity is needed as the frame memory 2Y when compared to the case where the device is adapted to the NTSC television system.

To solve the above-described problem, it may seem useful to adopt a method of reducing the required capacity of the frame memory 2Y for the PAL television system by digitizing the Y signal at the sampling frequency 4 fsc (=14.3 MHz) if the Y signal is to be made to conform to the NTSC television system, or at the sampling frequency 3 fsc (=13.3 MHz) if the Y signal is to be made to conform to the PAL television system. However, such a method still has a number of disadvantages. For example, if the digital balanced modulator 3 is to be operated at the sampling frequency 3 fsc (=13.3 MHz) to balanced-modulate the color-difference signals R−Y and B−Y, a circuit for forming a factor $\sqrt{3}/2$ by calculations is needed in the digital balanced modulator 3 to multiply 4 fsc by $\sqrt{3}/2$. As a result, a complicated circuit is needed, and to arrange the signal processing device so that it can be adapted to both of the NTSC and PAL television systems, a circuit for switching the sampling frequency between 4 fsc and 3 fsc becomes necessary.

SUMMARY OF THE INVENTION

It is, therefore, an object of the present invention to provide an image signal processing device capable of solving the above-described problems.

Another object of the present invention is to provide an image signal processing device capable of stably encoding two kinds of color-difference signals into a carrier chrominance signal without degrading the color-difference signals.

To achieve the above-described objects, according to one aspect of the present invention, there is provided an image signal processing device for processing an image signal, which comprises digital data inputting means for inputting digital data corresponding to two kinds of color-difference signals in synchronism with a clock signal corresponding to a data rate of the digital data, digital data reconstructing means for reconstructing the digital data corresponding to the two kinds of color-difference signals inputted by the digital data inputting means into digital data synchronized with a clock signal having a frequency which is an integer multiple of a color subcarrier frequency, and outputting the reconstructed digital data, and digital data forming means for forming digital data corresponding to a chrominance signal by using the reconstructed digital data corresponding to the two kinds of color-difference signals outputted from the digital data reconstructing means.

Another object of the present invention is to provide an image signal processing device capable of forming video signals of various kinds corresponding to a plurality of kinds of television systems by means of a simple construction.

To achieve the above-described objects, according to one aspect of the present invention, there is provided an image signal processing device for processing an image signal, which comprises a first oscillator for generating a clock signal for digitizing each of two kinds of color-difference signals, a digital color-difference data forming circuit for receiving the two kinds of color-difference signals, digitizing each of the received two kinds of color-difference signals in accordance with the clock signal generated from the first oscillator to form two kinds of digital color-difference data, and outputting the two kinds of digital color-difference data, a second oscillator for generating a subcarrier signal for encoding the two kinds of color-difference signals into a chrominance signal, a phase synchronization controlling circuit for phase-synchronizing the subcarrier signal outputted from the second oscillator with the clock signal generated from the first oscillator, and outputting the phase-synchronized subcarrier signal, a shift circuit for shifting the two kinds of digital color-difference data outputted from the digital color-difference data forming circuit in accordance with the subcarrier signal outputted from the phase synchronization controlling circuit, and then outputting the two kinds of digital color-difference data, a digital balanced modulator for balanced-modulating the two kinds of digital color-difference data outputted from the shift circuit in accordance with the subcarrier signal generated from the second oscillator to form a digital chrominance signal, and outputting the digital chrominance signal, and a digital-to-analog converter for converting-the digital chrominance signal outputted from the digital balanced modulator into an analog chrominance signal, and outputting the analog chrominance signal.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
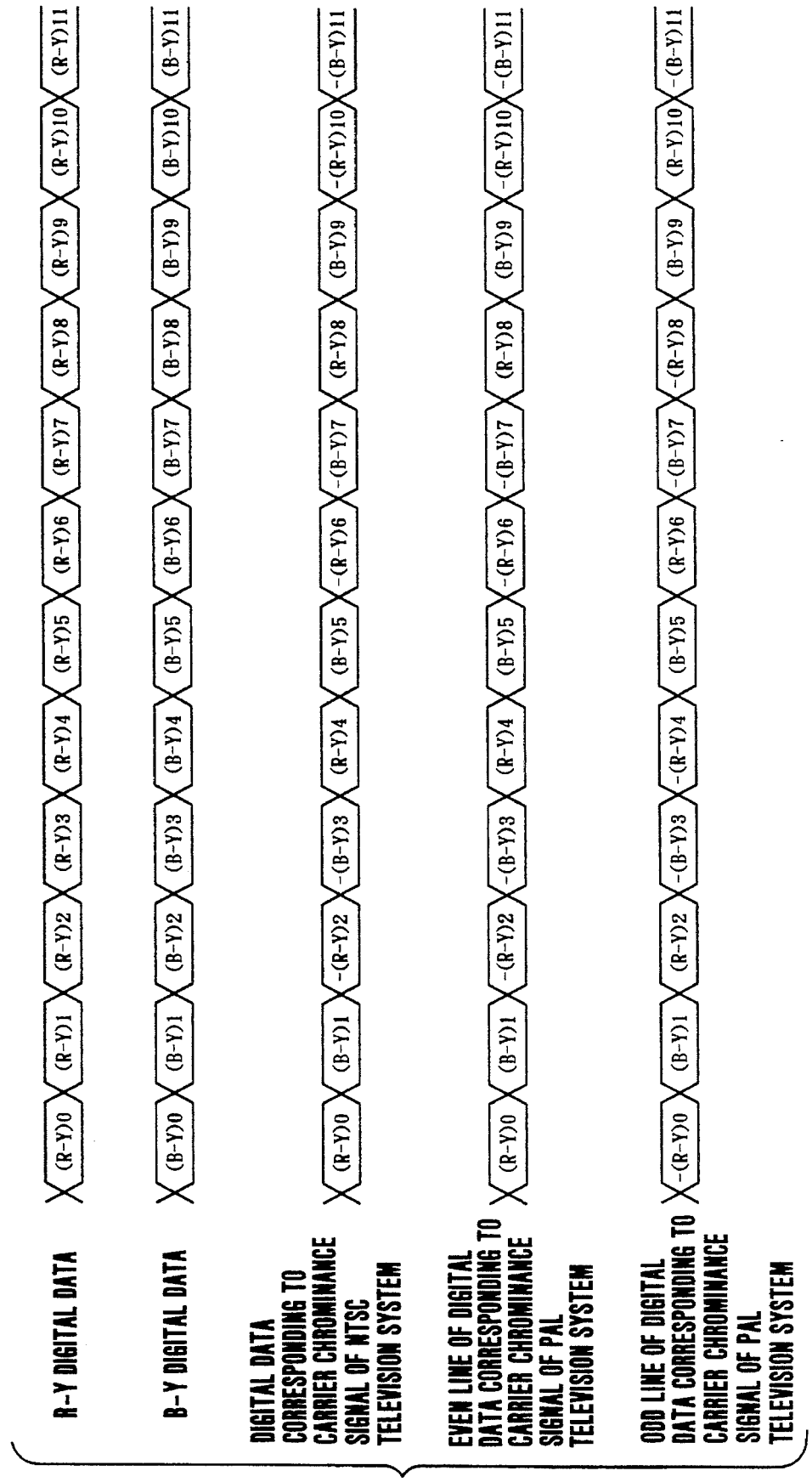
FIG. 1 is a timing chart aiding in explaining the operation of a conventional image signal processing device.
Figure 2:
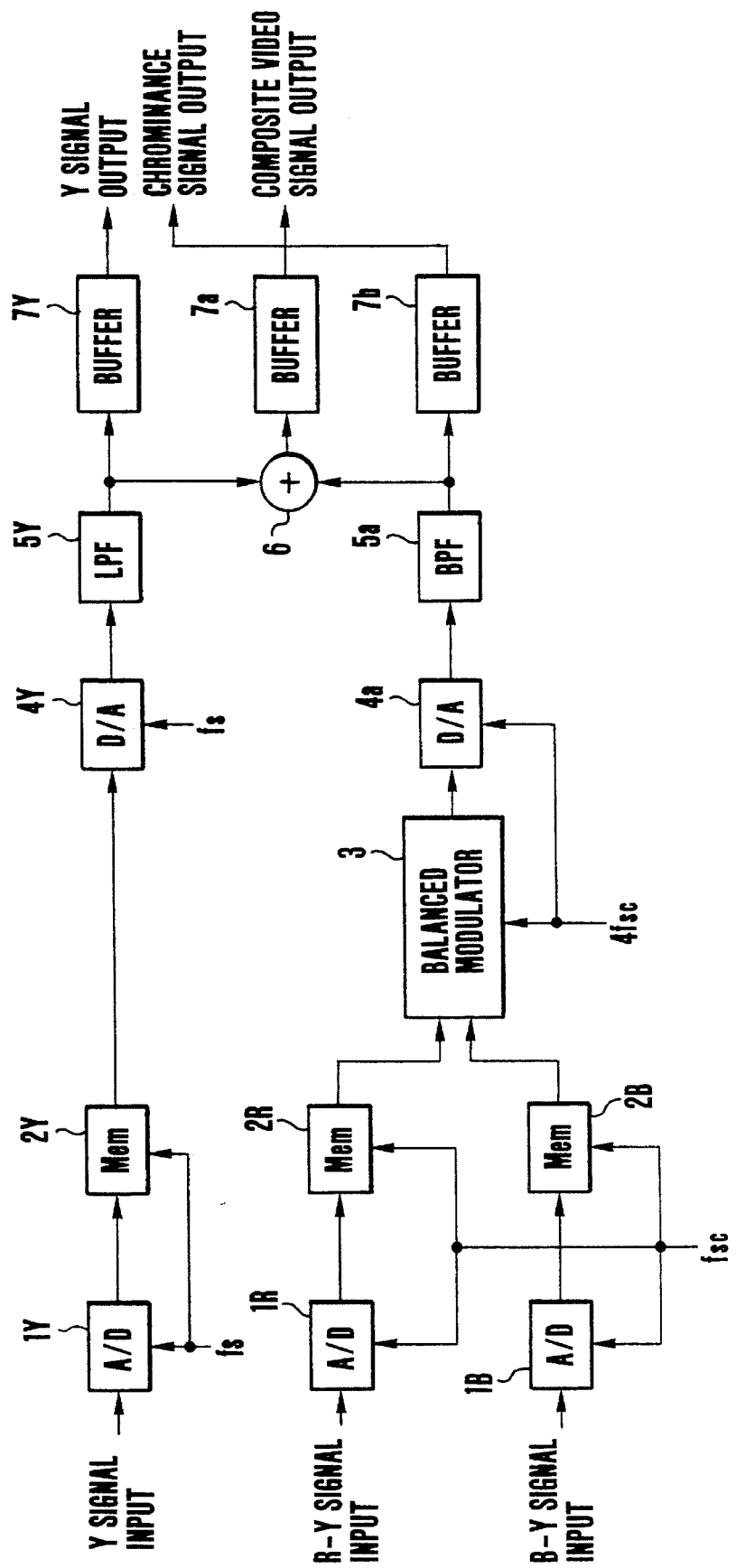
FIG. 2 is a schematic block diagram showing the construction of a conventional signal processing device for forming a composite video signal from a luminance signal and two kinds of color-difference signals.
Figure 3:
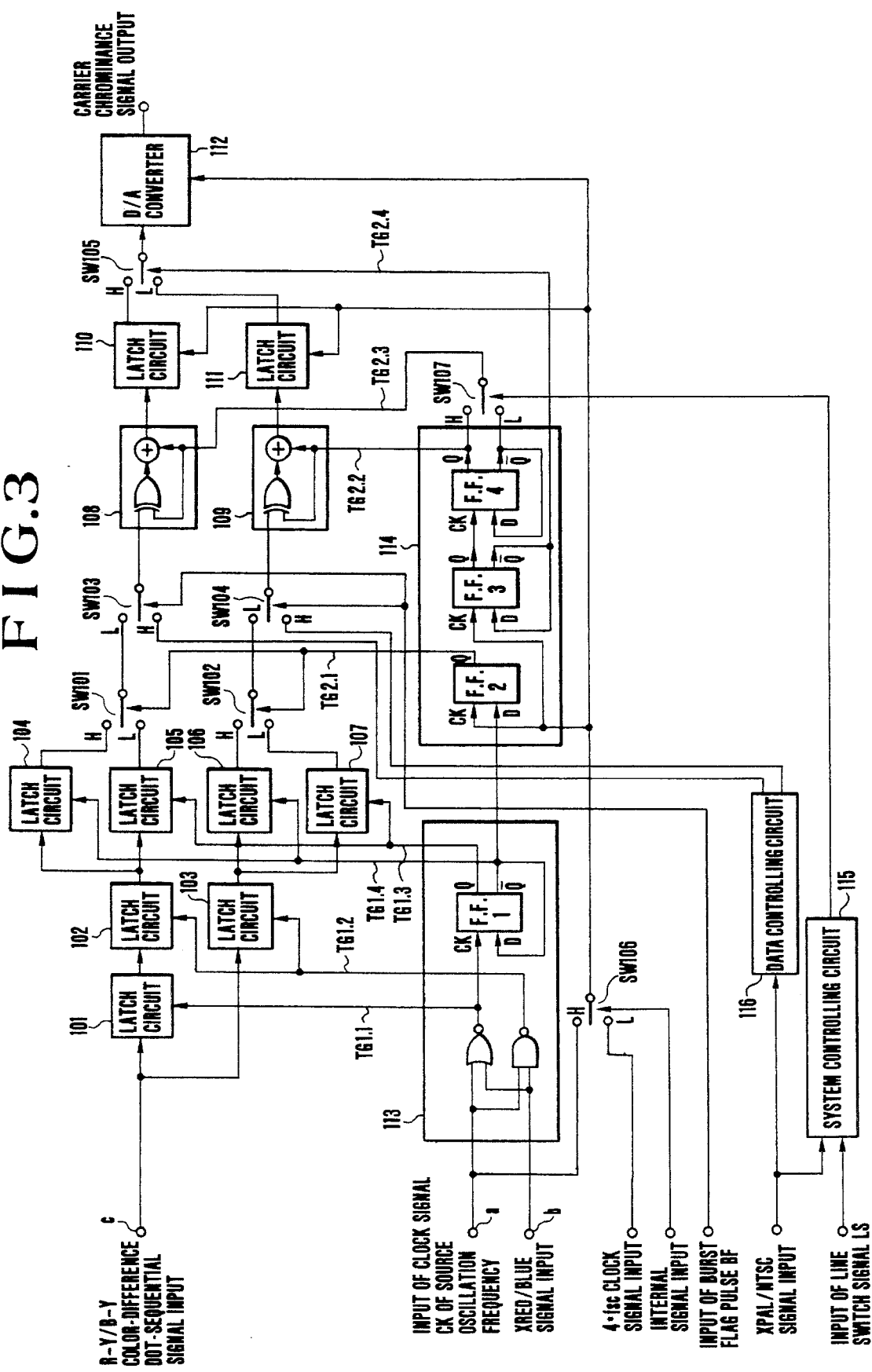
FIG. 3 is a block diagram schematically showing the construction of an image signal processing device according to a first embodiment of the present invention.

FIG. 3 is a block diagram schematically showing the construction of an image signal processing device according to a first embodiment of the present invention. FIGS. 4 to 7 are timing charts respectively showing the operating timings of each part of the image signal processing device of FIG. 3 for different kinds of modes.

The device shown in FIG. 3 includes latch circuits 101 to 107, 110 and 111 for latching digital data, polarity controlling circuits 108 and 109 for controlling the polarities of the respective digital data, a D/A converter 112 for converting digital data into an analog signal, and switch circuits SW101 to SW107.

The shown device also includes a timing signal generating circuit 113 for generating various kinds of timing signals for controlling the latch circuits 101 to 107, a timing signal generating circuit 114 for generating various kinds of timing signals for controlling the polarity controlling circuits 108 and 109 or the switch circuits SW101, SW102 and SW105. The timing signal generating circuit 113 includes a NOR gate, a NAND gate and a single flip-flop circuit FF-1, while the timing signal generating circuit 114 includes three flip-flop circuits FF-2 to FF-4.

The shown device also includes a system controlling circuit 115 for controlling the operation of each part in accordance with each kind of mode, and a data controlling circuit 116 for setting the value of digital data to be supplied to each of the switch circuits SW103 and SW104.

The operation of the device shown in FIG. 3 to encode two kinds of color-difference signals R–Y and B–Y into a carrier chrominance signal corresponding to the NTSC television system will be described below with reference to the timing chart shown in FIG. 4.

In the device shown in FIG. 3, the following signals are supplied to input terminals "a" to "c", respectively. Two kinds of digital color-difference signals R–Y and B–Y are supplied to the input terminal "c" in a dot-sequential state (that is, in the state of an R–Y/B–Y color-difference dot-sequential signal). A clock signal CK is supplied to the input terminal "a". The clock signal CK is a signal of source oscillation frequency for use in sampling which is carried out for the formation of the R–Y/B–Y color-difference dot-sequential signal inputted through the input terminal "c", (for example the frequency of the clock signal CK is a frequency other than an integer multiple of a color subcarrier frequency fsc which will be described later, 48/7·fsc in the example referred to herein). An XRED/BLUE signal is supplied to the input terminal "b". The XRED/BLUE signal indicates whether digital data indicative of the R–Y signal or digital data indicative of the B–Y signal is currently being inputted through the input terminal "c" as the R–Y/B–Y color-difference dot-sequential signal (that is, if the XRED/BLUE signal is at its low level, it indicates that digital data indicative of the R–Y signal is being inputted, while if the XRED/BLUE signal is at its high level, it indicates that digital data indicative of the B–Y signal is being inputted). The timing relationships between the above-described signals supplied to the respective input terminals "a" to "c" are as shown in Parts (a) to (c) of FIG. 4.

The R–Y/B–Y color-difference dot-sequential signal inputted through the input terminal "c" at the above-described timing is supplied to the latch circuits 101 and 103.

The latch circuits 101 and 103 are also respectively supplied with latch clock signals TG1.1 and TG1.2 for defining latch timing. The latch clock signals TG1.1 and TG1.2 are formed at the timing shown in Parts (d) and (e) of FIG. 4 in accordance with the clock signal CK and the XRED/BLUE signal in a logic circuit made up of the NOR gate and the NAND gate in the timing signal generating circuit 113. In the latch circuits 101 and 103, the R–Y/B–Y color-difference dot-sequential signal is separated into the digital data indicative of the R–Y signal and the digital data indicative of the B–Y signal, and the digital data indicative of the R–Y signal is latched by the latch circuit 102 in accordance with the timing of the latch clock signal TG1.2. Thus, the digital data indicative of the R–Y signal is converted into a simultaneous digital signal relative to the digital data indicative of the B–Y signal, and the digital data shown in Parts (f) to (h) of FIG. 4 are outputted from the respective latch circuits 101 to 103.

The digital data R–Y outputted from the latch circuit 102 is supplied to the latch circuits 104 and 105, while the digital data B–Y outputted from the latch circuit 103 is supplied to the latch circuits 106 and 107.

Figure 4:
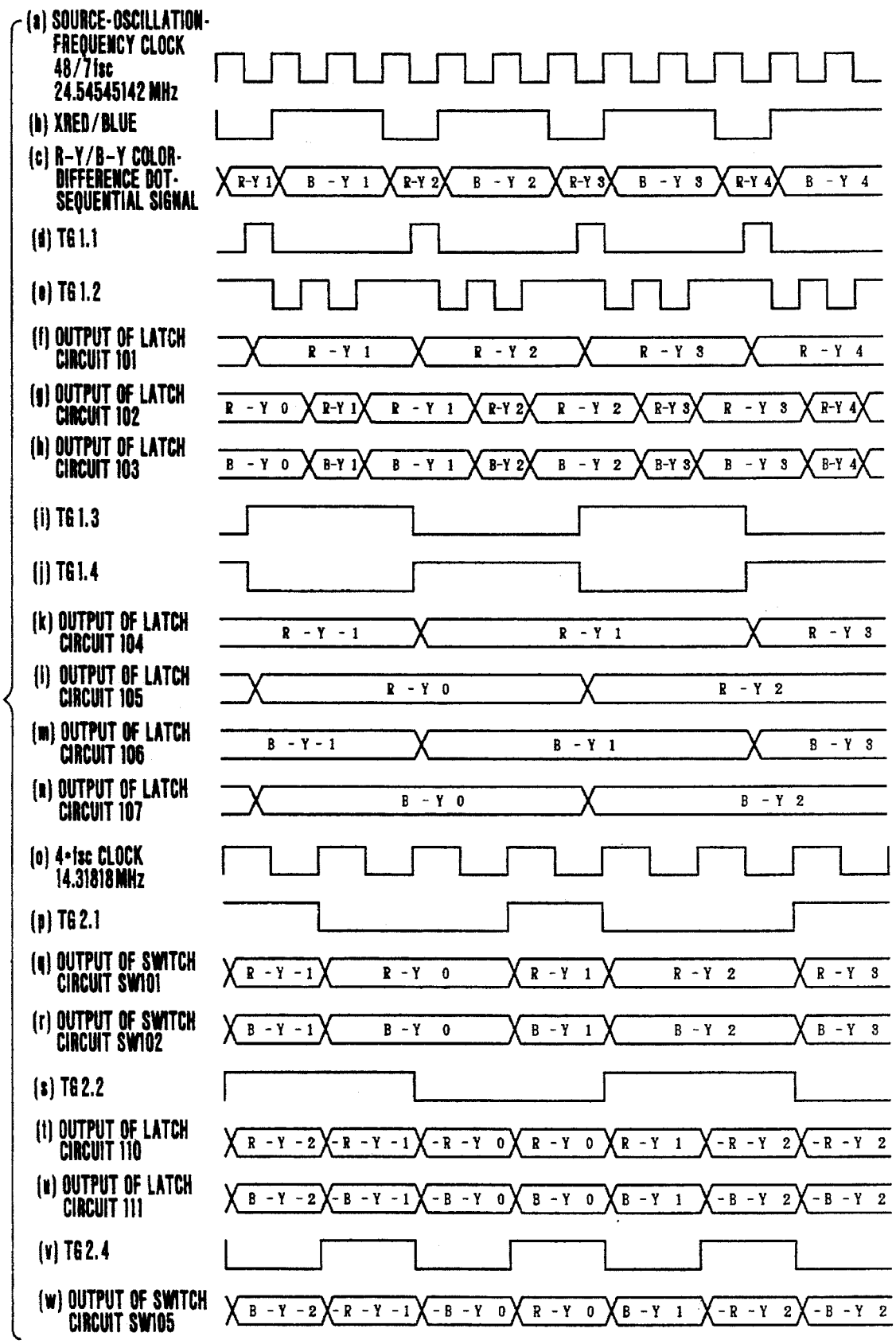
FIG. 4 is a timing chart showing the operating timing of each part of the device shown in FIG. 3.

In the timing signal generating circuit 113, the latch clock signal TG1.1 is inputted to the flip-flop circuit FF-1 and the frequency of the latch clock signal TG1.1 is divided by two, whereby a latch clock signal TG1.3 and a latch clock signal TG1.4 which is inverted in polarity with respect to the latch clock signal TG1.3 are formed as shown in Parts (i) and (j) of FIG. 4. The latch clock signal TG1.3 is supplied to the latch circuits 105 and 107, while the latch clock signal TG1.4 is supplied to the latch circuits 104 and 106. Even-numbered digital data and odd-numbered digital data are selectively latched from each of the two kinds of digital data sequences R–Y and B–Y, and each of the digital data sequences R–Y and B–Y is separated so that the transition points between adjacent data among the even-numbered digital data and those between adjacent data among the odd-numbered digital data can appear in alternate sequence. The thus-obtained signals are respectively outputted from the latch circuits 104 to 107 as the signals shown in Parts (k) to (n) of FIG. 4.

The odd-numbered and even-numbered digital data into which the digital data sequence R–Y has been separated by the respective latch circuits 104 and 105 are supplied to the switch circuit SW101, while the odd-numbered and even-numbered digital data into which the digital data sequence B–Y has been separated by the respective latch circuits 106 and 107 are supplied to the switch circuit SW102. The two kinds of digital data R–Y and B–Y are reconstructed by and outputted from the respective switch circuits SW101 and SW102 by controlling their respective selecting operations in accordance with a switch selection control signal TG2.1 formed by the timing signal generating circuit 114.

The switch selection control signal TG2.1 for controlling the selecting operations of the switch circuits SW101 and SW102 is a signal formed by synchronizing, in the flip-flop circuit FF-2 in the timing signal generating circuit 114, the latch clock signal TG1.4 formed in the timing signal generating circuit 113 with a clock signal 4 fsc of frequency which is an integer multiple (in this example, four times) of the color subcarrier frequency fsc supplied through the switch circuit SW106. Accordingly, the reconstructed two kinds of digital data sequences R–Y and B–Y outputted from the respective switch circuits SW101 and SW102 are converted into digital data sequences formed by being subjected to re-sampling at a sampling frequency which is an integer multiple (in this example, four times) of the color subcarrier frequency fsc (refer to Parts (o) to (r) of FIG. 4).

More specifically, in a case where each of the switch circuits SW101 and SW102 is arranged so that the even-numbered digital data are selected during periods in each of which the switch selection control signal TG2.1 is at the low level, while the odd-numbered digital data are selected during periods in each of which the switch selection control signal TG2.1 is at the high level, the switch selection control signal TG2.1 may be formed from a signal such as the latch clock signal TG1.4, for example, a signal whose falling and rising edges respectively correspond to one of the transition points between the adjacent even-numbered digital data and to one of the transition points between adjacent odd-numbered digital data. In such a case, the switching timing of each of the switch circuits SW101 and SW102 is controlled in such a manner that it is offset from both any transition point between the adjacent even-numbered digital data and any transition point between the adjacent odd-numbered digital data. Accordingly, in priciple, in each of the reconstructed two kinds of digital data sequences R–Y and B–Y outputted from the respective switch circuits SW101 and SW102, neither the transition points between the adjacent even-numbered digital data nor the transition points between the adjacent odd-numbered digital data appear in any position corresponding to the portion of the switch selection control signal TG2.1 which excludes the falling and rising edges thereof. Accordingly, re-sampling is effected in the above-described manner.

The two kinds of digital data sequences R–Y and B–Y re-sampled and reconstructed in the above-described manner are respectively supplied to the switch circuits SW103 and SW104.

In the meantime, R–Y burst level data to be added to the R–Y digital data and B–Y burst level data to be added to the B–Y digital data are supplied to the respective switch circuits SW103 and SW104 from the data controlling circuit 116 which is controlled by an XPAL/NTSC signal for mode setting (if the XPAL/NTSC signal is at its low level, a PAL mode is selected, while if it is at its high level, an NTSC mode is selected). In this case, the R–Y burst level data and the B–Y burst level data are each set to a predetermined value in accordance with the mode selected from the PAL mode and the NTSC mode.

Only the burst flag portions of the respective R–Y and B–Y digital data are replaced with the associated burst level data by controlling the selection operation of each of the switch circuits SW103 and SW104 in accordance with a burst flag pulse BF, whereby burst flags are added to the respective R–Y and B–Y digital data. The two kinds of digital data sequences R–Y and B–Y processed in the above-described manner are supplied to the respective polarity controlling circuits 108 and 109.

The polarity controlling circuits 108 and 109 are controlled by a polarity control signal TG2.2 formed in the timing signal generating circuit 114. If the polarity control signal TG2.2 is at its high level, the polarity controlling circuits 108 and 109 invert the polarities of the respective input digital data sequences R–Y and B–Y on the basis of their AC center levels (that is, their black levels), and output the resultant signals.

The signals outputted from the respective polarity controlling circuits 108 and 109 are supplied to the latch circuits 110 and 111, where the signals are latched in accordance with the clock signal 4 fsc of frequency which is an integer multiple (in this example, four times) of the color subcarrier frequency-fsc. The signals from the latch circuits 110 and 111 are supplied to the switch circuit SW105 whose selection operation is controlled by a switch selection control signal TG2.4 formed in the timing signal generating circuit 114.

The aforesaid polarity control signal TG2.2 is obtained by dividing the frequency of the clock signal CK by four by means of the flip-flop circuits FF-3 and FF-4 in the timing signal generating circuit 114. The aforesaid switch selection control signal TG2.4 is obtained by dividing by two the frequency of the clock signal 4 fsc which is an integer multiple (in this example, four times) of the chrominance subcarrier frequency fsc by means of the flip-flop circuit FF-3 in the timing signal generating circuit 114.

The polarity control signal TG2.3 is a timing signal outputted from the switch circuit SW107. The timing signal is either one of the polarity control signal TG2.2 and a signal which is inverted in polarity with respect to the polarity control signal TG2.2. Selection from the polarity control signal TG2.2 and the signal of inverted polarity is performed by the switch circuit SW107 whose selection operation is controlled by the system controlling circuit 115 which is controlled by the XPAL/NTSC signal and a line switch signal LS whose polarity is inverted for each horizontal scanning period (frequency is fh). The latching operations of the latch circuits 110 and 111 are controlled by a signal outputted from the switch SW106, and also the polarities of the two digital data R–Y and B–Y are controlled by the respective polarity control circuits 108 and 109 in accordance with the mode selected from the PAL mode and the NTSC mode, and in addition the two kinds of digital data R–Y and B–Y are alternately selected by the switch circuit SW105. A carrier chrominance signal is formed in the above-described manner.

The polarity control signal TG2.3 is controlled to be consistently a signal equivalent to the polarity control signal TG2.2 shown in Part (s) of FIG. 4, by the system controlling circuit 115. Accordingly, as shown in Parts (s) to (w) of FIG. 4, a digital carrier chrominance signal conforming to the NTSC television system is outputted from the switch circuit SW105 to the D/A converter 112. The D/A converter 112 converts the digital carrier chrominance signal into an analog signal and outputs the analog signal.

Figure 5:
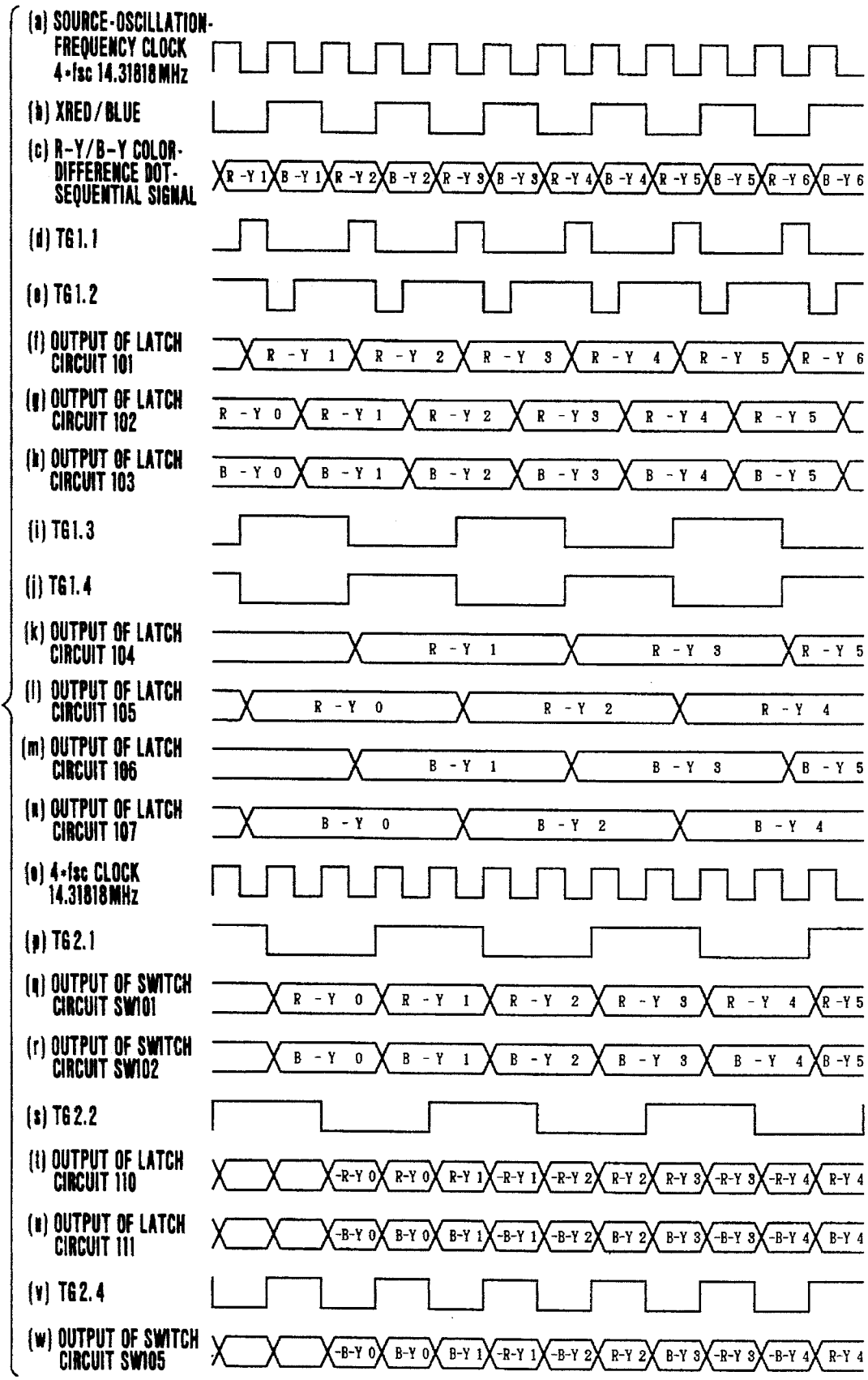
FIG. 5 is a timing chart showing the operating timing of each part of the device shown in FIG. 3.
Figure 6:
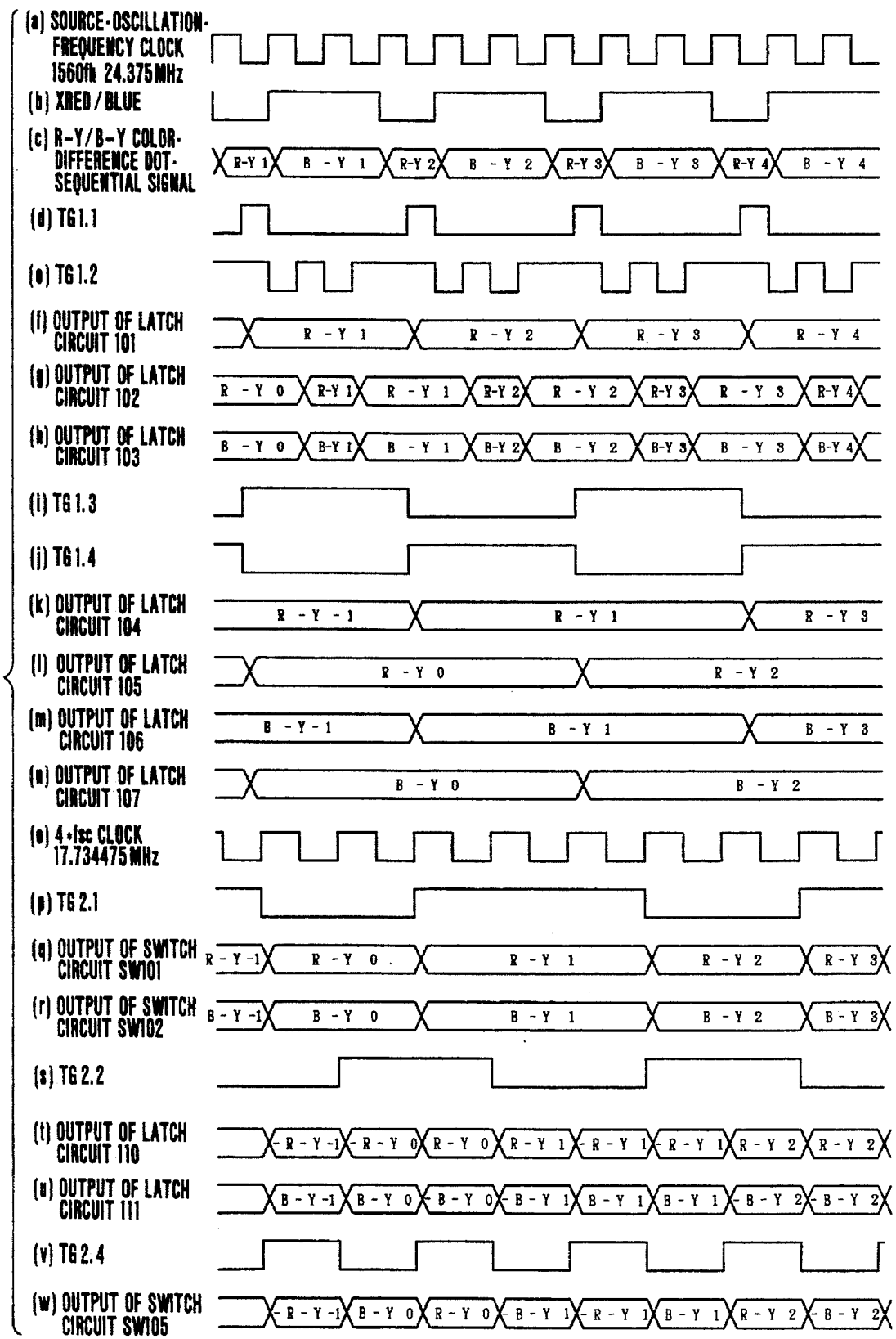
FIG. 6 is a timing chart showing the operating timing of each part of the device shown in FIG. 3.
Figure 7:
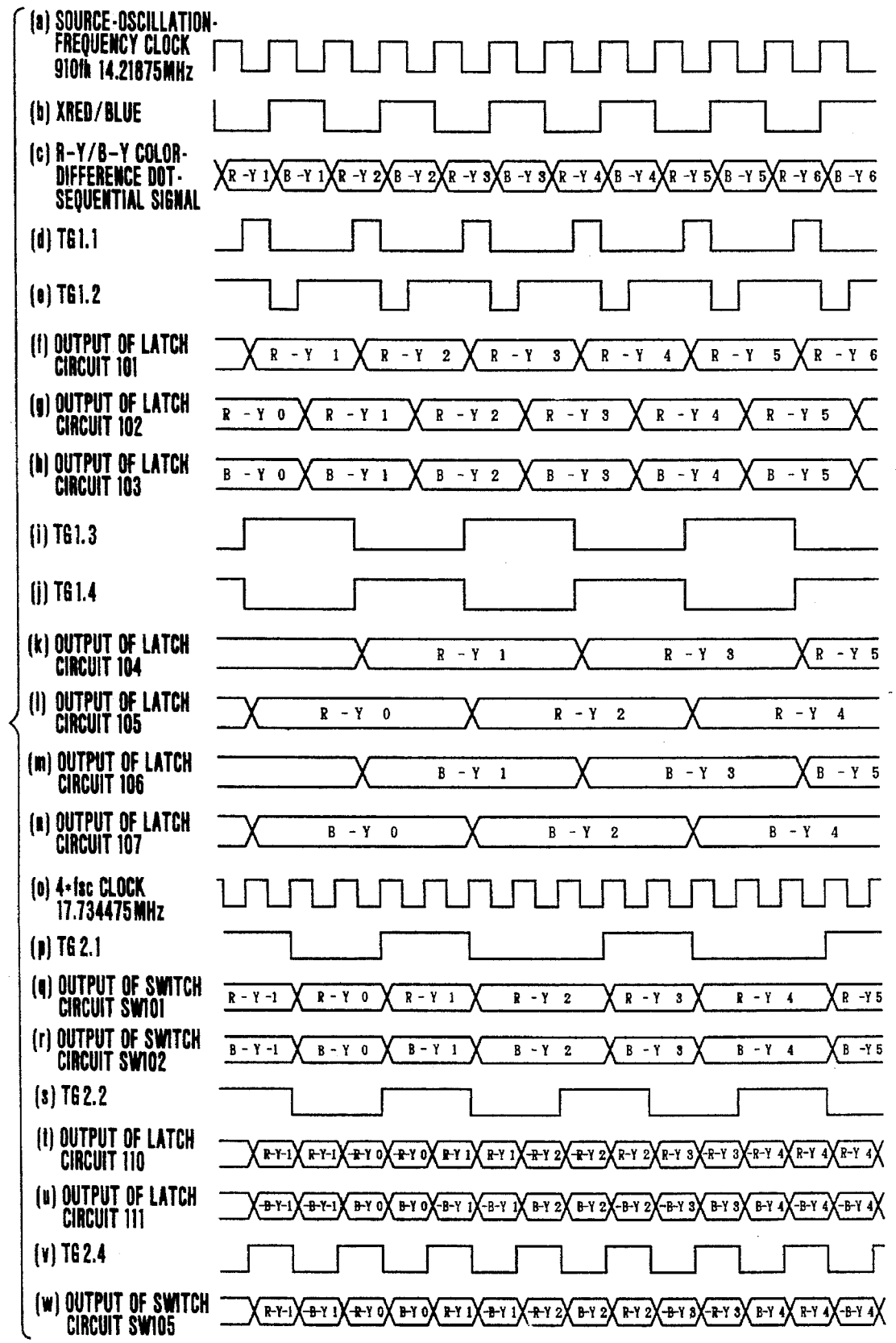
FIG. 7 is a timing chart showing the operating timing of each part of the device shown in FIG. 3.

FIGS. 5 to 7 are timing charts respectively showing the operating timings of each part of the image signal processing device of FIG. 3 for other modes. FIG. 5 is a timing chart showing the operation of encoding the two kinds of color-difference signals R–Y and B–Y into a carrier chrominance signal corresponding to the NTSC television system on the basis of the clock signal CK of source oscillation frequency for use in sampling which is carried out for the formation of the R–Y/B–Y color-difference dot-sequential signal inputted through the input terminal "c" shown in FIG. 3, and the frequency of the clock signal CK is selected to be an integer multiple (in this example, four times) of the color subcarrier frequency fsc. In the operation example shown in the timing chart of FIG. 5, if the frequency of the clock signal CK of source oscillation frequency is an integer multiple (in this example, four times) of the color subcarrier frequency fsc, the switch circuit SW106 of FIG. 3 is connected to the shown associated H side in accordance with a high-level internal signal and the image signal processing device of FIG. 3 is operated in synchronism with the clock signal CK of source oscillation frequency.

FIGS. 6 and 7 are timing charts each of which shows the operation of encoding the two kinds of color-difference signals R–Y and B–Y into a carrier chrominance signal corresponding to the PAL television system on the basis of the clock signal CK of source oscillation frequency for use in sampling which is carried out for the formation of the R–Y/B–Y color-difference dot-sequential signal inputted through the input terminal "c" shown in FIG. 3, and the frequency of the clock signal CK is selected not to be an integer multiple of the color subcarrier frequency fsc. The operation example shown in FIG. 6 differs from that shown in FIG. 7 in the frequency of the clock signal CK of source oscillation frequency, as well as in the duty ratio of the digital data R–Y to the digital data B–Y in the R–Y/B–Y color-difference dot-sequential signal inputted through the input terminal "c". The duty ratios in the operation examples of FIGS. 6 and 7 are 1:2 and 1:1, respectively.

The operation based on the timing chart shown in each of FIGS. 5 to 7 is substantially identical to that based on the timing chart shown in FIG. 4 except for the above-described points.

Referring again to Part (w) of FIG. 4 which shows the digital data outputted from the switch circuit SW105, digital data are omitted which correspond to the respective digital data R–Y1 and B–Y–1 contained in the input R–Y/B–Y color-difference dot-sequential signal shown in Part (c) of FIG. 4. This omission is performed during the process of executing rate conversion of the digital data through the above-described re-sampling operation and alternately outputting the resultant digital data R–Y and B–Y from the switch circuit SW105. However, the omission of part of the digital data does not cause any substantial problem in practical use since the frequency band of each of the two kinds of color-difference signals R–Y and B–Y is generally narrow (for example, 1.5 MHz) and sampling is, therefore, performed at a sufficiently high sampling frequency (for example, 7.16 MHz) with respect to the frequency band of each of the two kinds of color-difference signals R–Y and B–Y.

In the above-described first embodiment, as shown in FIGS. 4 to 7, the frequency of the clock signal CK of source oscillation frequency and the frequency of the clock signal 4 fsc which is an integer multiple (in this example, four times) of the color subcarrier frequency fsc are selected as described above. However, in general, in the operation of the above-described first embodiment, if the condition that one period of the clock signal 4 fsc is shorter than a half period of the latch clock signal TG1.4 is satisfied, the clock signal CK and the clock signal 4 fsc may have arbitrary frequencies, respectively.

As is apparent from the above description, according to the first embodiment, even if the sampling frequency at which the two kinds of color-difference signals R–Y and B–Y are sampled is a frequency other than an integer multiple of the color subcarrier frequency of a carrier chrominance signal into which they are to be encoded, it is possible to stably encode the two kinds of color-difference signals R–Y and B–Y into the carrier chrominance signal by digital processing by means of a simple construction without degrading the color-difference signals R–Y and B–Y.

Figure 8:
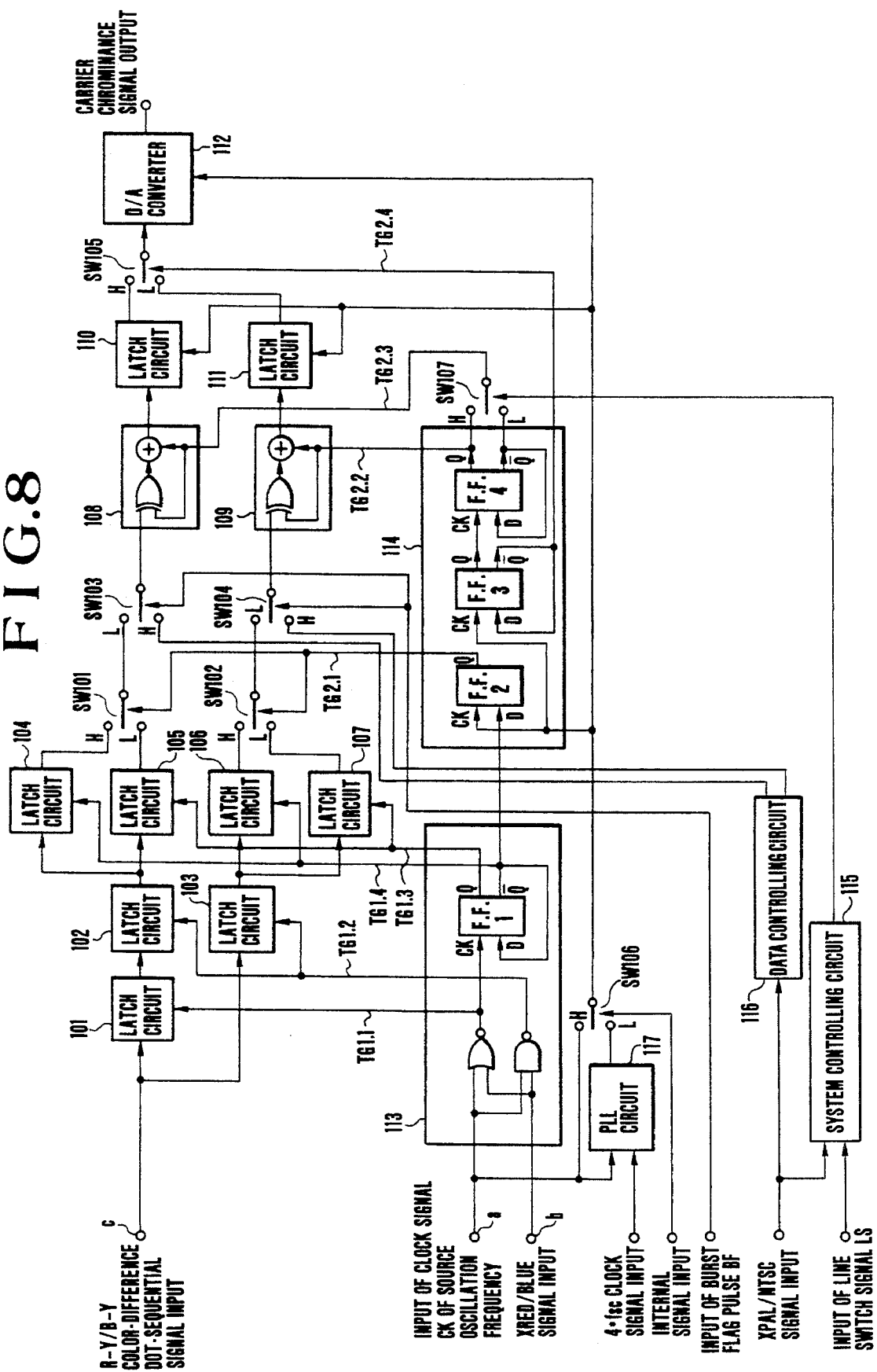
FIG. 8 is a block diagram schematically showing the construction of an image signal processing device according to a second embodiment of the present invention.

FIG. 8 is a block diagram schematically showing the construction of an image signal processing device according to a second embodiment of the present invention.

Since the construction of the device shown in FIG. 8 is substantially identical to that of the device shown in FIG. 3, the following description refers to only parts distinct from those used in the construction shown in FIG. 3.

In the device shown in FIG. 8, a PLL (phase-locked loop) circuit 117 operates so that the clock signal 4 fsc which is an integer multiple (in this example, four times) of the color subcarrier frequency fsc is phase-locked to the clock signal CK of source oscillation frequency for use in sampling which is carried out for the formation of the R–Y/B–Y color-difference dot-sequential signal inputted through the input terminal "c" shown in FIG. 8.

If the image signal processing device having the construction shown in FIG. 3 is operated in accordance with the timing chart shown in FIG. 4, the frequency of the clock signal CK of source oscillation frequency (48/7·fsc) is 1560 fh on the basis of the relationship of fsc=455/2·fh, and the frequency of the clock signal 4 fsc which is an integer multiple (in this example, four times) of the color subcarrier frequency fsc is 910 fh, that is, the frequency of each of the clock signal CK and the clock signal 4 fsc becomes an integer multiple of one horizontal scanning frequency fh. Accordingly, a sampling structure of geometrically square lattice can be attained on a television picture.

Accordingly, if the phase relationship between the clock signal CK of source oscillation frequency and the clock signal 4 fsc which is an integer multiple (in this example, four times) of the color subcarrier frequency is impaired, the sampling structure of geometrically square lattice in the digital data is impaired and deformed due to the re-sampling processing. For this reason, as shown in FIG. 8, the PLL circuit 117 is provided for phase-locking the clock signal 4 fsc, which is an integer multiple (in this example, four times) of the color subcarrier frequency fsc, to the clock signal CK of source oscillation frequency for use in sampling which is carried out for the formation of the R–Y/B–Y color-difference dot-sequential signal inputted through the input terminal "c" shown in FIG. 8. Accordingly, it is possible to effect far more accurate and stable rate conversion of the two kinds of digital data R–Y and B–Y.

As is apparent from the above description, according to the second embodiment, it is possible to provide a versatile image signal processing device which is capable of dealing with various sampling frequencies so that even if the sampling frequency at which two kinds of color-difference signals R–Y and B–Y are digitized is a frequency other than an integer multiple of the color subcarrier frequency of a carrier chrominance signal into which they are to be encoded, it is possible to stably encode the two kinds of color-difference signals R–Y and B–Y into the carrier chrominance signal by digital processing by means of a simple and inexpensive construction without degrading the color-difference signals R–Y and B–Y.

Figure 9:
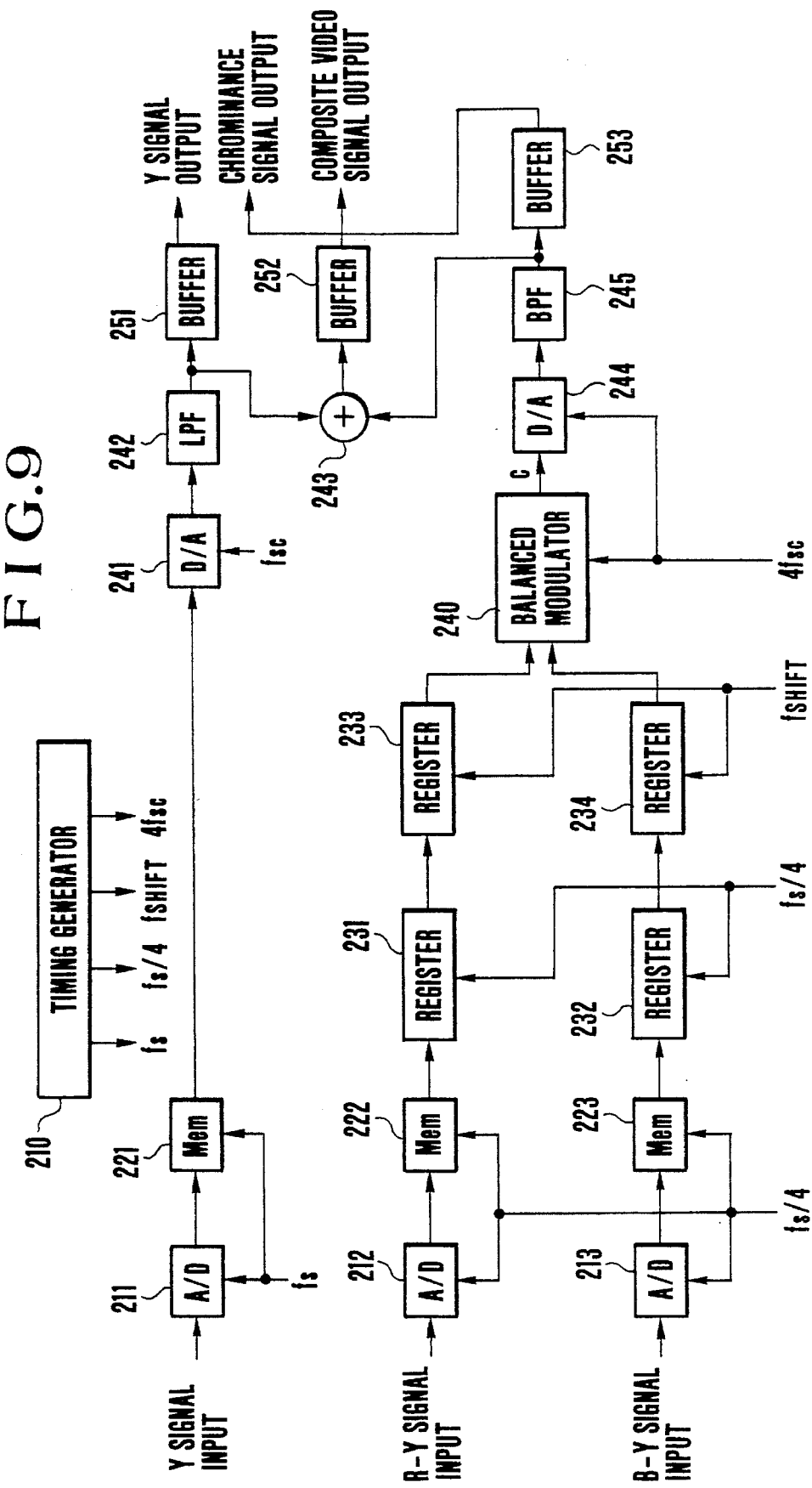
FIG. 9 is a block diagram schematically showing the construction of a signal processing device according to a third embodiment of the present invention.
Figure 10:
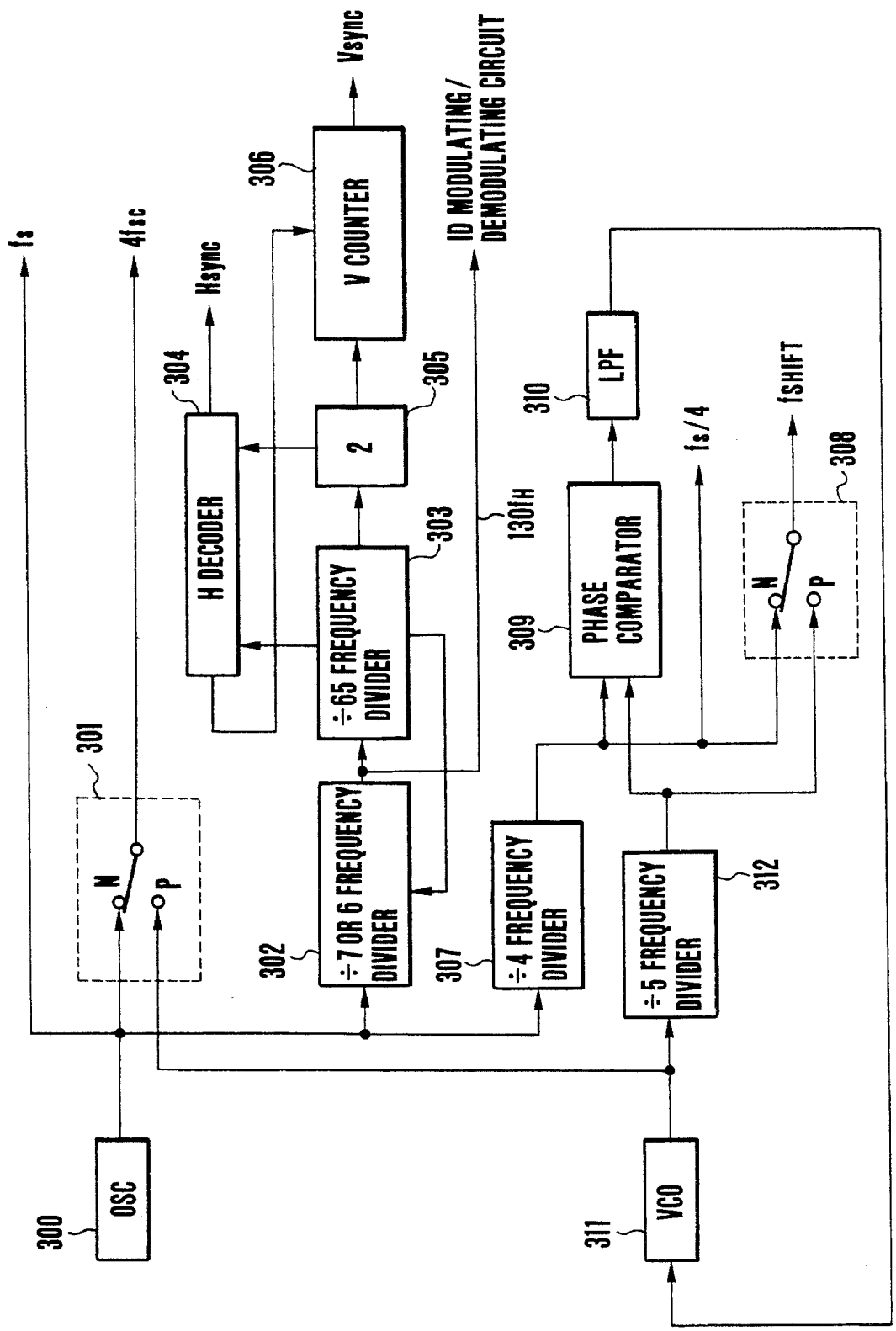
FIG. 10 is a block diagram showing in detail the construction of a timing generator provided in the signal processing device shown in FIG. 9.
Figure 11:
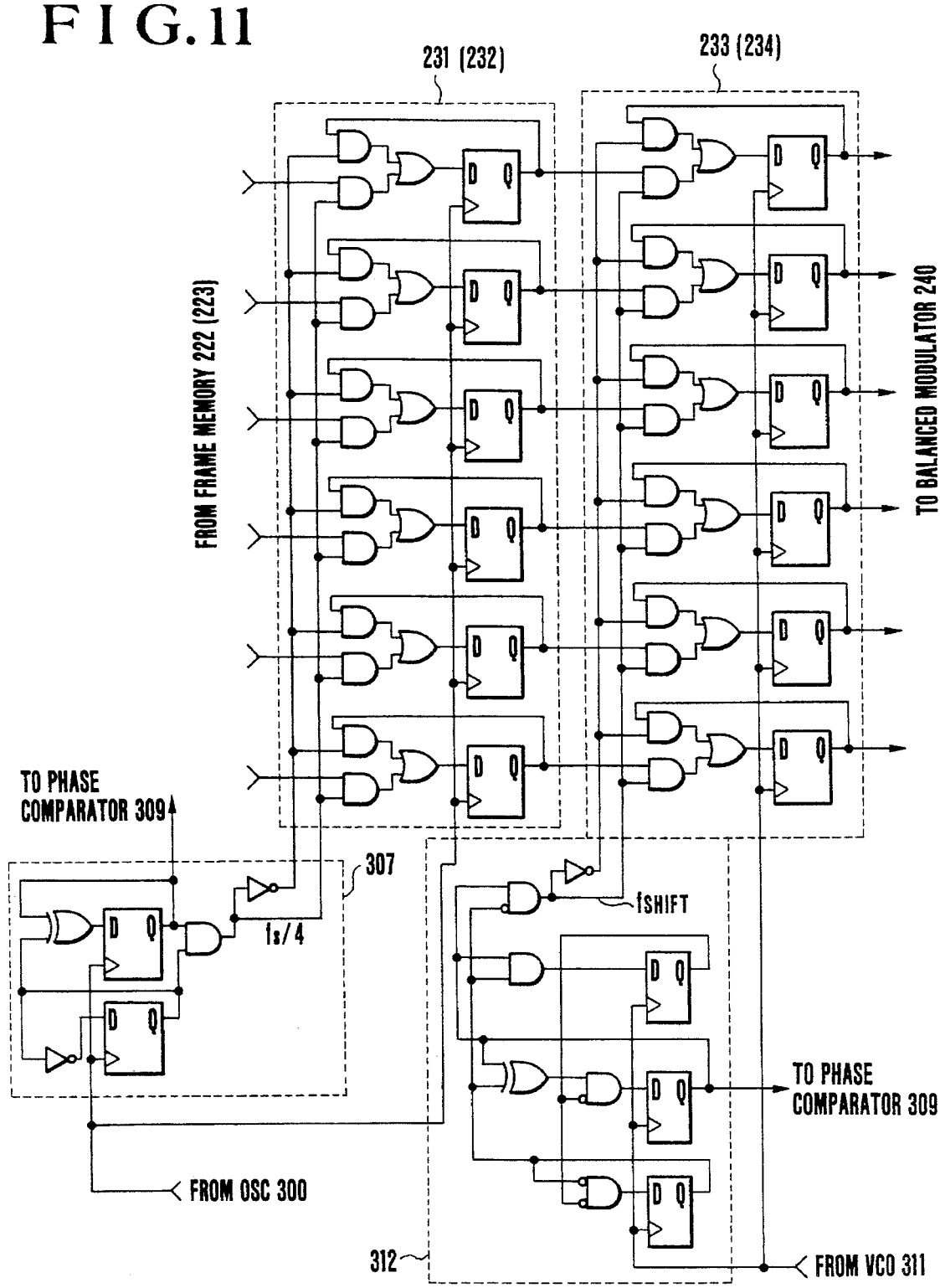
FIG. 11 is a block diagram showing in detail the constructions of shift registers provided in the signal processing device shown in FIG. 9.
Figure 12:
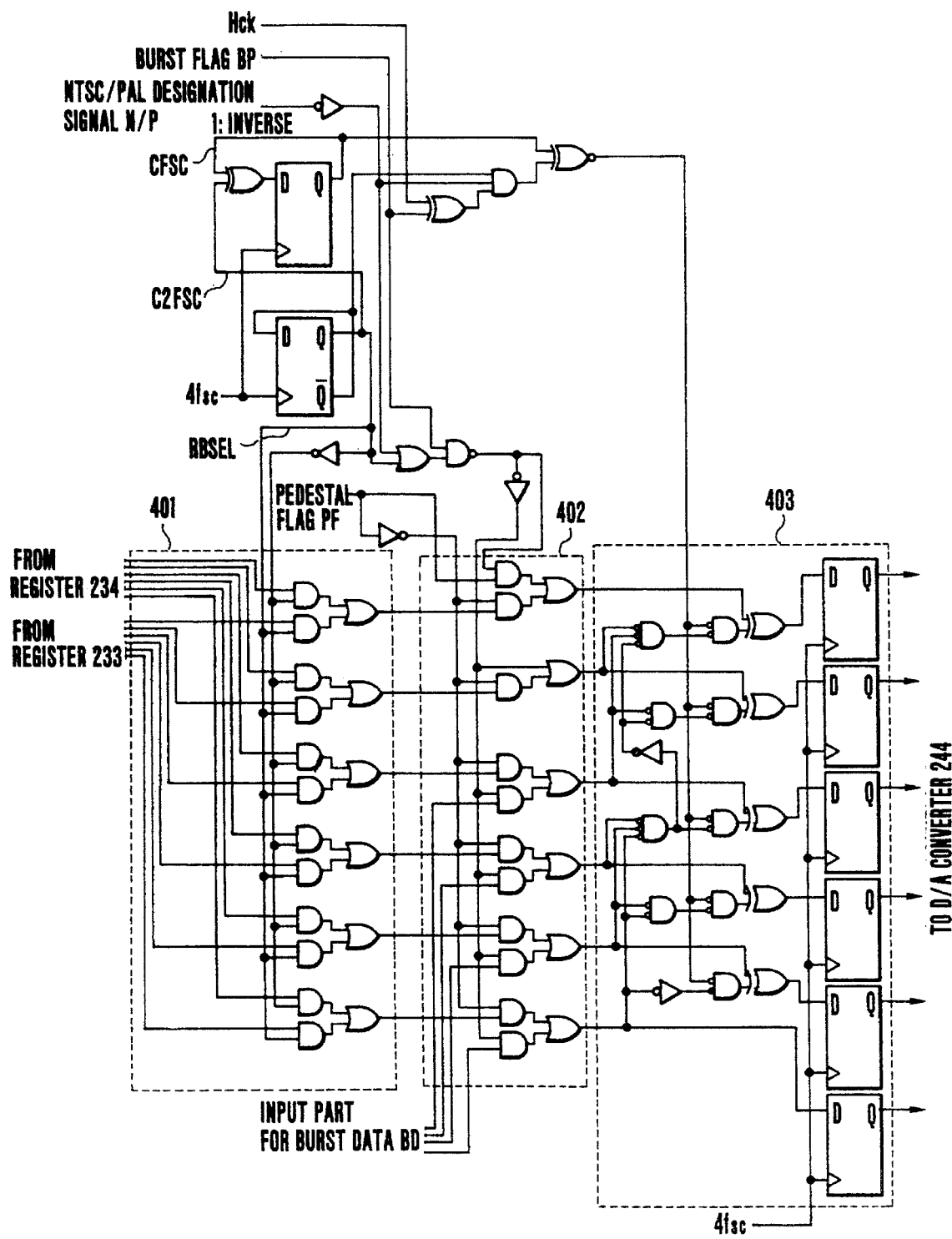
FIG. 12 is a block diagram showing in detail the construction of a balanced modulator provided in the signal processing device shown in FIG. 9.
Figure 13:
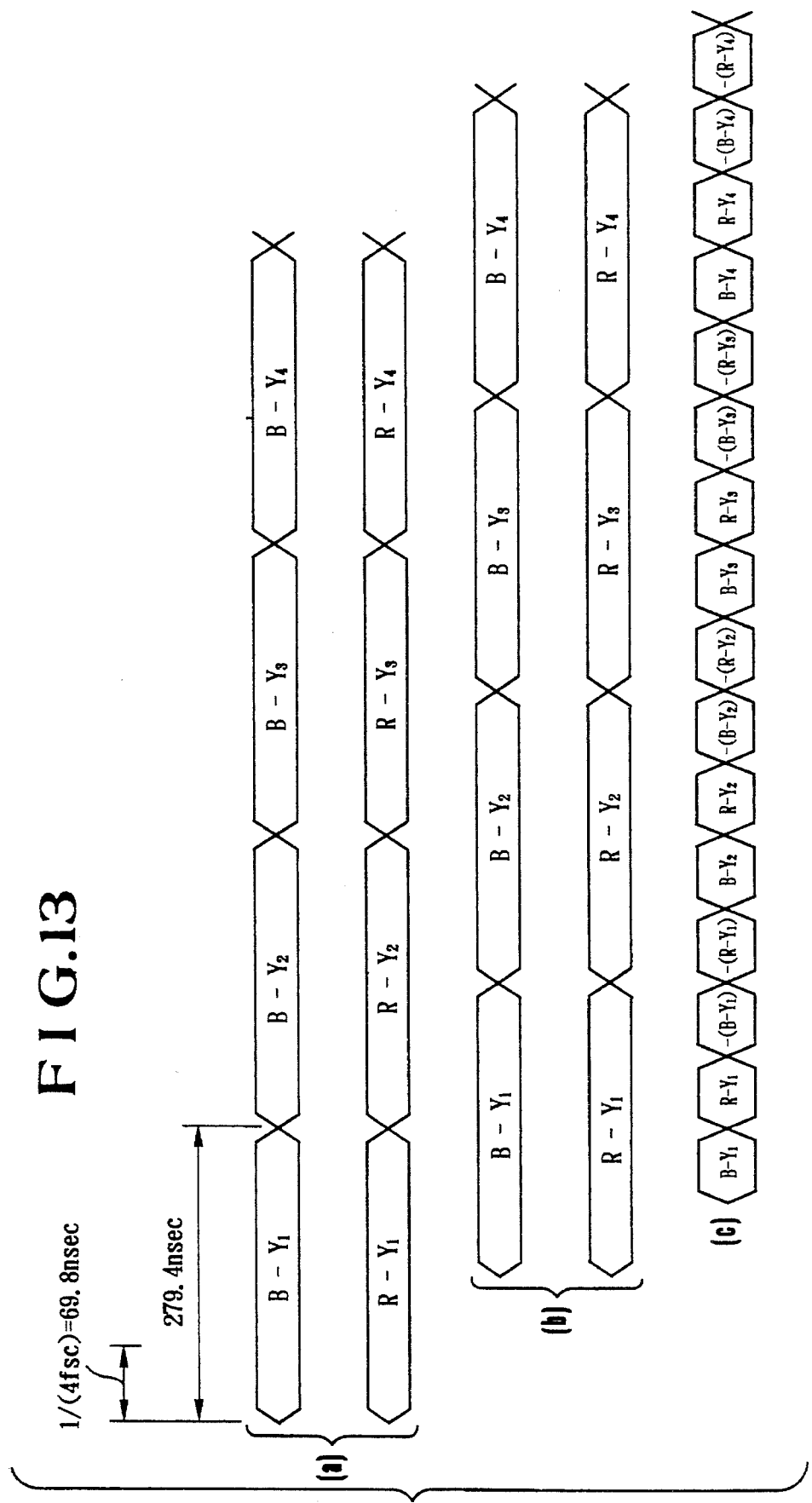
FIG. 13 is a timing chart aiding in explaining an operation which is performed by the signal processing device of FIG. 9 to form a video signal corresponding to the NTSC television system.
Figure 14:
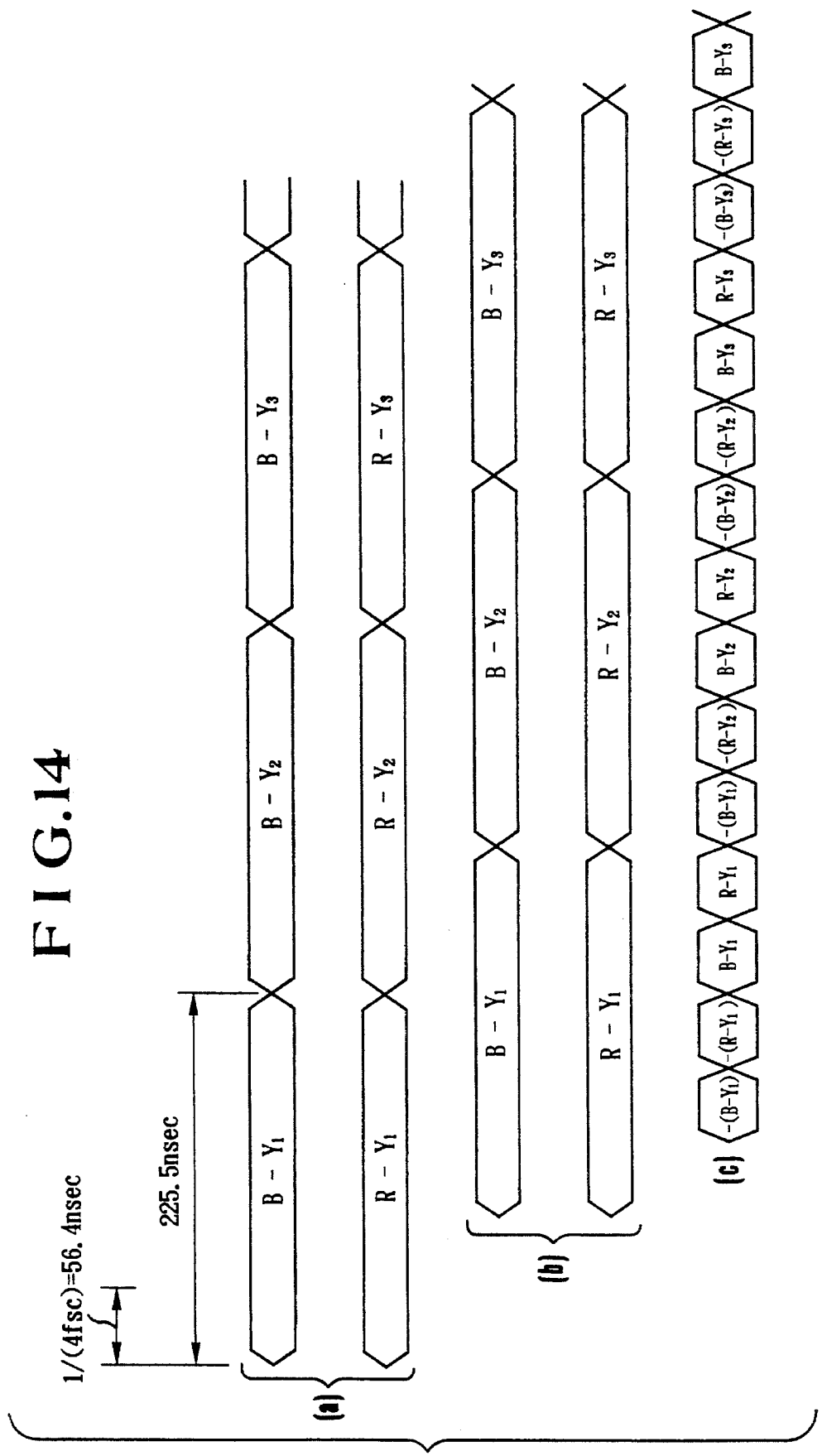
FIG. 14 is a timing chart aiding in explaining an operation which is performed by the signal processing device of FIG. 9 to form a video signal corresponding to the PAL television system.
Figure 15:
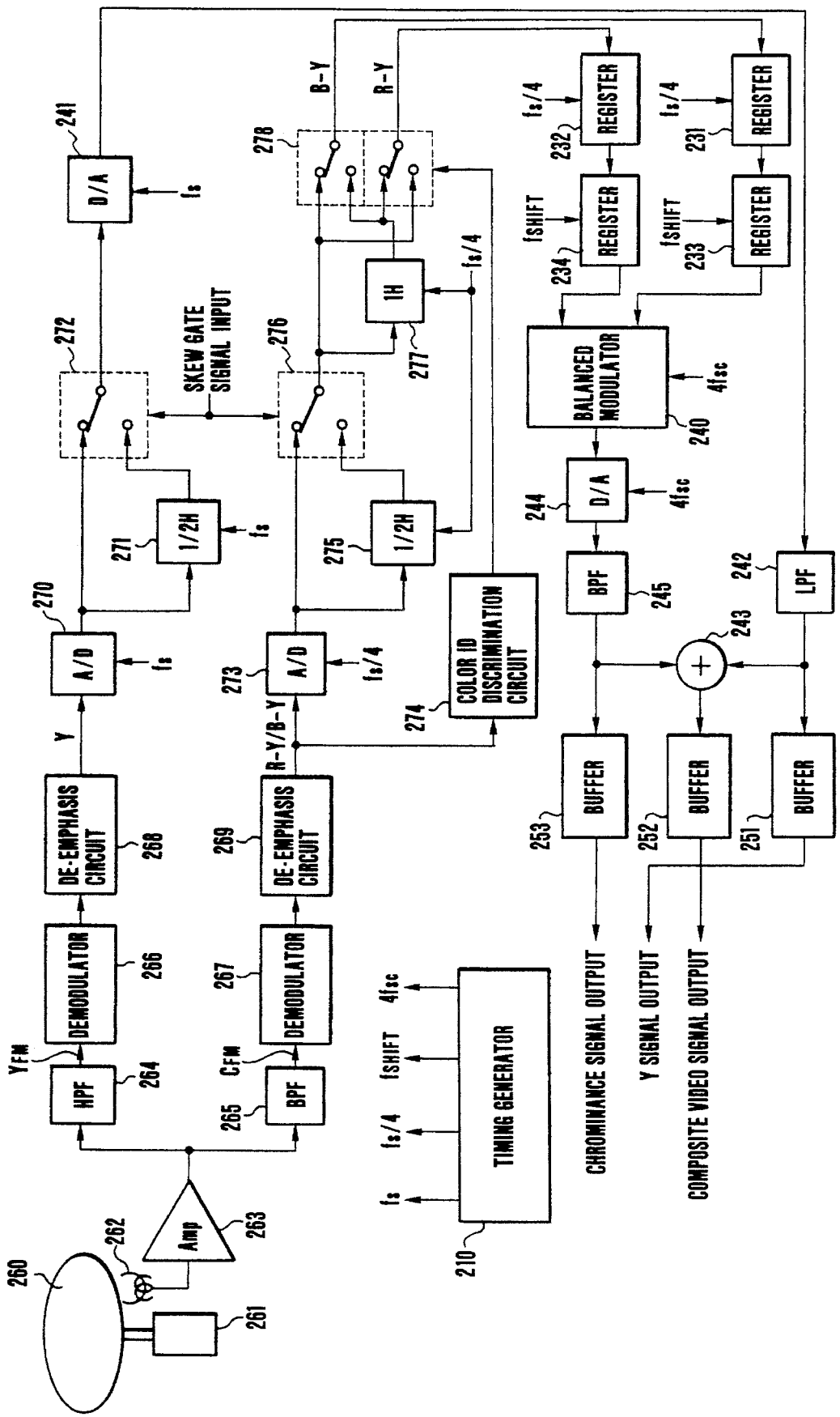
FIG. 15 is a block diagram showing one example of the construction of an electronic still video reproducing apparatus to which the signal processing device shown in FIG. 9 is applied.

A third embodiment of the present invention will be described below with reference to FIGS. 9 through 15. FIG. 9 is a block diagram showing a signal processing device according to the third embodiment of the present invention. FIG. 10 is a block diagram showing in detail the construction of a timing generator provided in the signal processing device shown in FIG. 9. FIG. 11 is a block diagram showing in detail the constructions of shift registers provided in the signal processing device shown in FIG. 9. FIG. 12 is a block diagram showing in detail the construction of a balanced modulator provided in the signal processing device shown in FIG. 9. FIG. 13 is a timing chart aiding in explaining an operation which is performed by the signal processing device of FIG. 9 to form a video signal corresponding to the NTSC television system. FIG. 14 is a timing chart aiding in explaining an operation which is performed by the signal processing device of FIG. 9 to form a video signal corresponding to the PAL television system. FIG. 15 is a block diagram showing one example of the construction of an electronic still video reproducing apparatus to which the signal processing device shown in FIG. 9 is applied.

As is known to those skilled in the art, the color subcarrier frequency fsc is 3.579545 MHz in the case of the NTSC television system or 4.43361875 MHz in the case of the PAL television system. In the signal processing device according to the third embodiment, it is assumed that, as a sampling frequency fs for a Y signal, 4 fsc (=14.31818 MHz≈ 14.3 MHz) is employed in the case of the NTSC television system, while 16 fsc/5 (=14.18758 MHz≈14.2 MHz) is employed in the case of the PAL television system.

As shown in FIG. 9, a timing generator 210 generates the sampling frequency fs for the Y signal, a sampling frequency fs/4 for the color-difference signals R–Y and B–Y, a shift clock signal fSHIFT, and the frequency signal 4 fsc for balanced modulation. The shift clock signal fSHIFT is a clock signal of frequency fsc/4 (=0.895 MHz) in the case of the NTSC television system or a clock signal of frequency fsc/5 (=0.887 MHz) in the case of the PAL television system.

The Y signal is converted into a digital signal by an A/D converter 211 which operates in accordance with the sampling frequency signal fs, and the digital signal is stored in a frame memory 221. More specifically, if the signal processing device is to be operated in accordance with the NTSC television system, the Y signal is digitized by using the sampling frequency signal 4 fsc (=14.3 MHz), while if the signal processing device is to be operated in accordance with the PAL television system, the Y signal is digitized by using the sampling frequency signal 16 fsc/5 (=14.2 MHz). The thus-obtained digital signal is stored in the frame memory 221. The digital Y signal stored in the frame memory 221 is read out and converted into an analog signal by a D/A converter 214 which operates in accordance with the sampling frequency signal fsc. The analog signal is applied to a low-pass filter 242, and a signal passed through the low-pass filter 242 is supplied to an adder 243 and to a buffer 251. The signal supplied to the buffer 251 is outputted as a Y signal.

In the meantime, the color-difference signals R–Y and B–Y are respectively converted into digital signals by A/D converters 212 and 213 which operate in accordance with the sampling frequency signal fs/4. The digital signals outputted from the A/D converters 212 and 213 are stored into associated frame memories 222 and 223. More specifically, if the signal processing device is to be operated in accordance with the NTSC television system, the color-difference signals R–Y and B–Y are digitized by using the sampling frequency signal 4 fsc (=3.58 MHz), while if the signal processing device is to be operated in accordance with the PAL television system, the color-difference signals R–Y and B–Y are digitized by using the sampling frequency signal 4 fsc/5 (=3.62 MHz). The thus-obtained digital signals are respectively stored in the frame memories 222 and 223.

The digital color-difference signals R–Y and B–Y stored in the respective frame memories 222 and 223 are read out and shifted by associated registers 231 and 232 which operate in accordance with the sampling frequency signal fs/4. The signals outputted from the respective registers 231 and 232 are shifted by registers 233 and 234 which operate in accordance with the shift clock signal fSHIFT. More specifically, color-difference signals R–Y and B–Y corresponding to the NTSC television system are shifted by the respective registers 233 and 234 by using the shift clock signal fsc/4 (=0.895 MHz), while color-difference signals R–Y and B–Y corresponding to the PAL television system are shifted by the respective registers 233 and 234 by using the shift clock signal fsc/5 (=0.887 MHz). The digital color-difference signals R–Y and B–Y outputted from the respective registers 233 and 234 are balanced-modulated by a digital balanced modulator 240 which operates in accordance with the sampling frequency signal 4 fsc, thereby forming a digital chrominance signal. The digital chrominance signal is converted into an analog signal by a D/A converter 244 and the analog signal is applied to a band-pass filter 245, and a signal passed through the band-pass filter 245 is supplied to the adder 243 and to a buffer 253. The signal supplied to the buffer 253 is outputted as a chrominance signal. The adder 243 adds the Y signal to the supplied chrominance signal, and the resultant signal is outputted from a buffer 252 as a composite video signal.

The construction of the timing generator 210 provided in the signal processing device shown in FIG. 9 will be described below in detail with reference to FIG. 10. The oscillator (OSC) 300 shown in FIG. 10 is arranged to be able to selectively output the sampling frequency signal fs for the Y signal, that is, to selectively output the sampling frequency signal 4 fsc (=14.31818 MHz) which is needed when the signal processing device shown in FIG. 4 is to be operated in accordance with the NTSC television system and the sampling frequency signal 16 fsc/5 (=14.18758 MHz) which is needed when the signal processing device shown in FIG. 4 is to be operated in accordance with the PAL television system.

As described above, the signal fs outputted from the OSC 300 is supplied to each of the A/D converter 211 and the frame memory 221 of FIG. 9 without any modification. If the signal processing device shown in FIG. 4 is to be operated in accordance with the NTSC television system, the signal fs from the OSC 300 is outputted through an input terminal N of a switch 301 as the sampling frequency signal 4 fsc which causes the digital balanced modulator 240 of FIG. 9 to operate. The frequency of the signal fs outputted from the OSC 300 is divided by four by a ÷4 frequency divider 307, and the resultant frequency signal is supplied, as the sampling frequency signal fs/4, to each of the A/D converters 212 and 213, the frame memories 222 and 223 and the registers 231 and 232 which are shown in FIG. 9. If the signal processing device is to be operated in accordance with the NTSC television system, the resultant frequency signal is supplied through an input terminal N of a switch 308 to each of the registers 233 and 234 of FIG. 9 as the shift clock signal fSHIFT.

The frequency of the signal fs outputted from the OSC 300 is also divided by seven or six by a ÷7 or 6 frequency divider 302, and the frequency of the signal outputted from the ÷7 or 6 frequency divider 302 is divided by sixty-five by the ÷65 frequency divider 303. The resultant frequency signal is supplied to an H (horizontal) decoder 304 as the sampling frequency signal fs/4. The signal frequency-divided by the ÷65 frequency divider 303 is also supplied to a ×2 multiplier 305, where the frequency of the signal is multiplied by two. The signal of frequency multiplied by two is supplied to the H decoder 304 and to a V (vertical) counter 306. The H decoder 304 resets the V counter 306 on the basis of the signal frequency-divided by the ÷65 frequency divider 303 and the signal frequency-multiplied by the ×2 multiplier 305, and also outputs a horizontal synchronizing signal (Hsync). Meanwhile, the V counter 306 outputs a vertical synchronizing signal (Vsync). The signal (130 fH in FIG. 10) having the frequency divided by seven or six by the ÷7 or 6 frequency divider 302 is also supplied to an ID modulating/demodulating circuit which is not shown. In the ID modulating/demodulating circuit, the frequency of the supplied signal is divided by five and then by two, thereby forming an ID carrier (13 fH).

A phase comparator 309 outputs a signal according to the phase difference between the signal having the frequency divided by four by the ÷4 frequency divider 307 and the signal having the frequency divided by five by the ÷5 frequency divider 312. The phase-error signal outputted from phase comparator 309 is converted into a phase-error voltage by a low-pass filter (LPF) 310. The voltage-controlled oscillator (VCO) 311 outputs a frequency signal (4 fsc=17.734475 MHz) controlled according to the phase-error voltage to an input terminal P of the switch 301 and to the ÷5 frequency divider 312. The ÷5 frequency divider 312 divides the frequency of the supplied signal by five and supplies the resultant signal to the phase comparator 309. The signal outputted from the ÷5 frequency divider 312 is also supplied through an input terminal P of the switch 308 to the registers 233 and 234 of FIG. 9 as the shift clock signal fSHIFT which is needed when the signal processing device is to be operated in accordance with the PAL television system. Accordingly, the phase comparator 309, the LPF 310, the VCO 311 and the ÷5 frequency divider 312 constitute a PLL circuit for phase-locking the signal outputted from the ÷4 frequency divider 307 to the signal outputted from the ÷5 frequency divider 312.

The ÷4 frequency divider 307 and the ÷5 frequency divider 312 of FIG. 10 are constructed as shown in FIG. 11. The ÷4 frequency divider 307 and the ÷5 frequency divider 312 of FIG. 10 respectively divide the frequencies of the signals outputted from the OSC 300 and the VCO 311 by four and five, and the resultant signal outputted from the ÷4 frequency divider 307 is supplied to the register 231 (and the register 232), while the resultant signal outputted from the ÷5 frequency divider 312 is supplied to the register 233 (and the register 234). Each of the registers 231 and 233 is constructed as shown in FIG. 11, and has 6-bit parallel inputs. The digital R−Y signal stored in the frame memory 222 of FIG. 9 is inputted to the register 231 by 6 bits per sample in parallel, and the input digital R−Y signal is shifted by using the signal fs/4. The signal outputted from the register 231 is inputted to the register 233 by 6 bits in parallel, and the input signal is shifted by using the shift clock signal fSHIFT. The signal outputted from the register 233 is inputted to the digital balanced modulator 240 of FIG. 9 by 6 bits in parallel. Although not shown, the registers 232 and 234 are constructed similarly to the registers 231 and 233. The digital B−Y signal stored in the frame memory 223 of FIG. 9 is inputted to the register 232 by 6 bits per sample in parallel, and the input digital B−Y signal is shifted by using the signal fs/4. The signal outputted from the register 232 is inputted to the register 234 by 6 bits in parallel, and the input signal is shifted by using the shift clock signal fSHIFT. The signal outputted from the register 234 is outputted to the digital balanced modulator 240 of FIG. 9 by 6 bits in parallel.

The digital balanced modulator 240 of FIG. 9 is constructed as shown in FIG. 12, and has a selecting circuit 401 for selecting the digital R−Y signal supplied from the registers 233 of FIG. 9 or the digital B−Y signal supplied from the register 234 of FIG. 9, a burst adding circuit 402 for adding a burst to the signal selected by the selecting circuit 401, a sign inverting circuit 403 for inverting the sign of a signal outputted from the burst adding circuit 402, and so on. The circuits 401 to 403 are connected in 6-bit parallel. In FIG. 12, symbol "Hck" denotes a clock signal whose phase is inverted at intervals of a 1 H period, symbol "BF" denotes a burst flag for defining a burst period, symbol "N/P" denotes an NTSC/PAL designation signal for designating the NTSC television system or the PAL television system, symbol "PF" denotes a pedestal flag for defining a pedestal period, and symbol "BD" denotes burst data.

An operation which is performed by the signal processing device to form a chrominance signal corresponding to the NTSC television system will be described below with reference to FIG. 13. As described previously in connection with FIG. 9, the color-difference signals R−Y and B−Y corresponding to the NTSC television system are digitized at the sampling frequency fs/4 (=fsc=3.58 MHz) by the respective A/D converters 212 and 213. The digital color-difference signals R–Y and B–Y are stored in the frame memories 222 and 223, respectively. The digital color-difference signals R–Y and B–Y read out from the respective frame memories 222 and 223 are shifted by the associated registers 231 and 232 which operate at the same sampling frequency fs/4. The signals outputted from the respective registers 231 and 232 are shifted by the registers 233 and 234 which operate in accordance with the shift clock signal fSHIFT (=4 fsc/4).

In the above-described case, the period of each of the color-difference signals R–Y and B–Y is 279.4 nsec as shown in Part (a) of FIG. 13, and the time shifted by each of the registers 233 and 234 is 69.8 nsec (=1/(4 fsc)) as shown in Part (b) of FIG. 13. The signals shifted by the respective registers 233 and 234 are balanced-modulated by the digital balanced modulator 240 as shown in Part (c) of FIG. 13 so that signals the signs of which are alternately inverted like (B–Y), (R–Y), –(B–Y), –(R–Y) . . . are formed and outputted.

An operation which is performed by the signal processing device to form .a chrominance signal corresponding to the PAL television System will be described below with reference to FIG. 14. As described previously in connection with FIG. 9, the color-difference signals R–Y and B–Y corresponding to the PAL television system are digitized at the sampling frequency fs/4 (=4 fsc/5=3.62 MHz) by the respective A/D converters 212 and 213. The digital color-difference signals R–Y and B–Y are stored in the frame memories 222 and 223, respectively. The digital color-difference signals R–Y and B–Y read out from the respective frame memories 222 and 223 are shifted by the associated registers 231 and 232 which operate at the same sampling frequency fs/4. The signals outputted from the respective registers 231 and 232 are shifted by the registers 233 and 234 which operate in accordance with the shift clock signal fSHIFT (=fsc/5).

In the above-described case, the period of each of the color-difference signals R–Y and B–Y is 225.5 nsec as shown in Part (a) of FIG. 14, and the time shifted by each of the registers 233 and 234 is 56.4 nsec (=1/(4 fsc)) as shown in Part (b) of FIG. 14. The shift clock signal fs/4 supplied to each of the registers 231 and 232 which are disposed as front-stage registers is generated by the oscillator (OSC) 300 of FIG. 10, while the shift clock signal fSHIFT supplied to each of the registers 233 and 234 which are disposed as rear-stage registers is generated by the voltage-controlled oscillator (VCO) 311. As a result, even if the shift clock signals fs/4 and fSHIFT are phase-locked by the PLL circuit, their phases relatively fluctuate to a small extent. For this reason, the rear-stage registers 233 and 234 are arranged to perform sampling at the timing when the states of data in the respective front-stage registers 231 and 232 are established.

As is apparent from the above description, in the above-described third embodiment, the oscillator 300 generates a clock signal for sampling color-difference signals, while the VCO 311 generates a subcarrier for encoding a chrominance signal. The phase of the subcarrier outputted from the VCO 311 is locked to the phase of the clock signal outputted from the oscillator 300 by the PLL circuit, and the registers 233 and 234 use the subcarrier phase-locked by the PLL circuit to shift the respective color-difference signals which have been sampled by using the clock signal outputted from the oscillator 300, thereby sampling the color-difference signals at a frequency other than a integer multiple of the frequency of the subcarrier to form digital color-difference signals. Accordingly, it is possible to encode the digital color-difference signals into a chrominance signal without converting the digital color-difference signals into analog signals. In addition, since the above-described circuits may be integrated into one IC chip together with other digital circuits, it is possible to realize a highly reliable circuit which is insusceptible to temperature variations or the like.

FIG. 15 is a block diagram showing one example of the construction of an electronic still video reproducing apparatus to which the signal processing device shown in FIG. 9 is applied. In FIG. 15, the frame memories 221, 222 and 223 shown in FIG. 9 are omitted and the Same reference numerals are used to denote elements similar to those shown in FIG. 9. Referring to FIG. 15, a video floppy disc 260 loaded in the apparatus is rotated at a predetermined rotational speed by a spindle motor 261, and a video signal recorded on the video floppy disc 260 is reproduced by a head 262. The reproduced video signal is amplified by an amplifier 263, and a luminance signal component YFM and a chrominance signal component CFM are extracted from the amplified video signal by a high-pass filter (HPF) 264 and a band-pass filter (BPF) 265, respectively- The luminance signal component YFM and the chrominance signal component CFM are respectively frequency-demodulated by demodulators 266 and 267, and the signals outputted from the respective demodulators 266 and 267 are subjected to de-emphasis processing in associated de-emphasis circuits 268 and 269. Thus, a luminance signal Y and a color-difference line-sequential signal R–Y/B–Y are restored.

As described previously in connection with FIG. 9, the luminance signal Y is digitized at the sampling frequency fs by the A/D converter 270, and the digital luminance signal Y is supplied to a skew gate switch 272 as a non-delayed signal and a signal delayed by ½ H by a ½ H delay line 271. The skew gate switch 272 is switched at intervals of one field period in accordance with a skew gate signal, whereby skew compensation is effected. The signal outputted from the skew gate switch 272 is converted into an analog signal by a D/A converter 241, and the analog signal is outputted from the D/A converter 241. In the meantime, the color-difference line-sequential signal R–Y/B–Y is digitized by an A/D converter 273. The color-difference line-sequential signal R–Y/B–Y digitized by the A/D converter 273 is supplied to a skew gate switch 276 as a non-delayed signal and a signal delayed by ½ H by a ½ H delay line 275. The skew gate switch 276 are switched at intervals of one field period in accordance with the skew gate signal, whereby skew compensation is effected. The signal outputted from the skew gate switch 276 is supplied to a gate switch 278 as a non-delayed signal and a signal delayed by 1 H by a 1 H delay line 277. The non-delayed signal and the 1 H delayed signal are converted into simultaneous signals by switching the gate switch 278 in accordance with a discrimination signal outputted from a color-ID discrimination circuit 274, and the gate switch 278 outputs digital R–Y and B–Y signals. The digital R–Y and B–Y signals are supplied to the respective registers 232 and 231. Thereafter, a Y signal, a chrominance signal and a composite video signal are formed and outputted as described previously in connection with FIG. 9. In the embodiment shown in FIG. 15, the ½ H delay line 271 is arranged to operate at the sampling frequency fs outputted from the timing generating circuit 210 shown in FIG. 9, and the ½ H delay line 275 and the 1 H delay line 277 are arranged to operate at the sampling frequency fs/4 outputted from the timing generating circuit 210.

As described above, the third embodiment comprises a first oscillator for generating a clock signal for digitizing a luminance signal and two kinds of color-difference signals, a second oscillator for generating a subcarrier for use in encoding the two kinds of color-difference signals into a chrominance signal, a phase synchronization controlling circuit for phase-synchronizing the subcarrier generated from the second oscillator with the clock signal generated from the first oscillator, and a shift circuit for shifting the two kinds of color-difference signals digitized according to the clock signal generated from the first oscillator, in accordance with the subcarrier phase-synchronized with the clock signal by the phase synchronization controlling circuit. The third embodiment having the above-described arrangement can digitize the two kinds of color-difference signals at a frequency other than an integer multiple of the frequency of the subcarrier. Accordingly, it is possible to form a video signal corresponding to an arbitrary television system.

Figure 16:
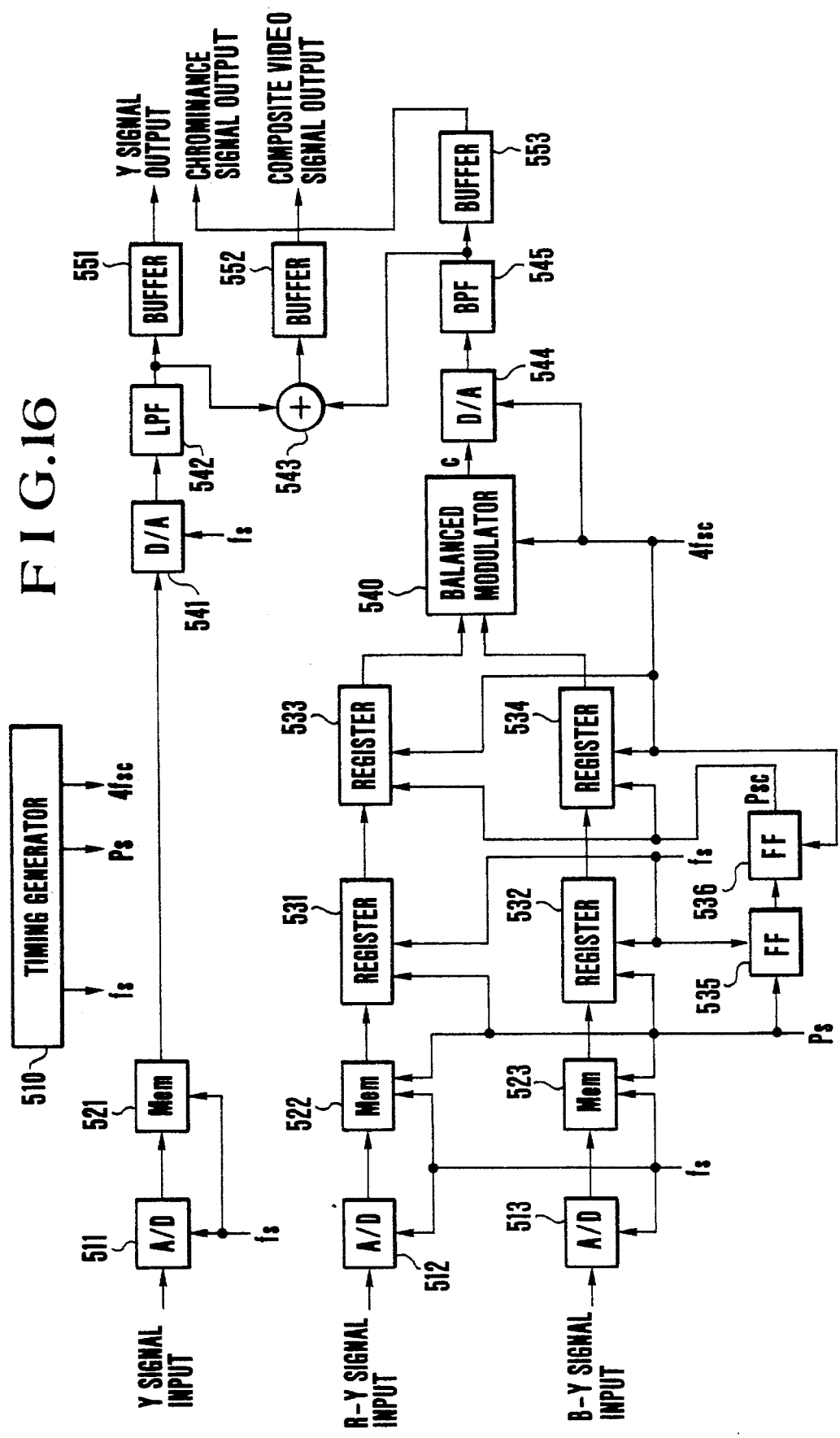
FIG. 16 is a block diagram schematically showing the construction of a signal processing device according to a fourth embodiment of the present invention.
Figure 17:
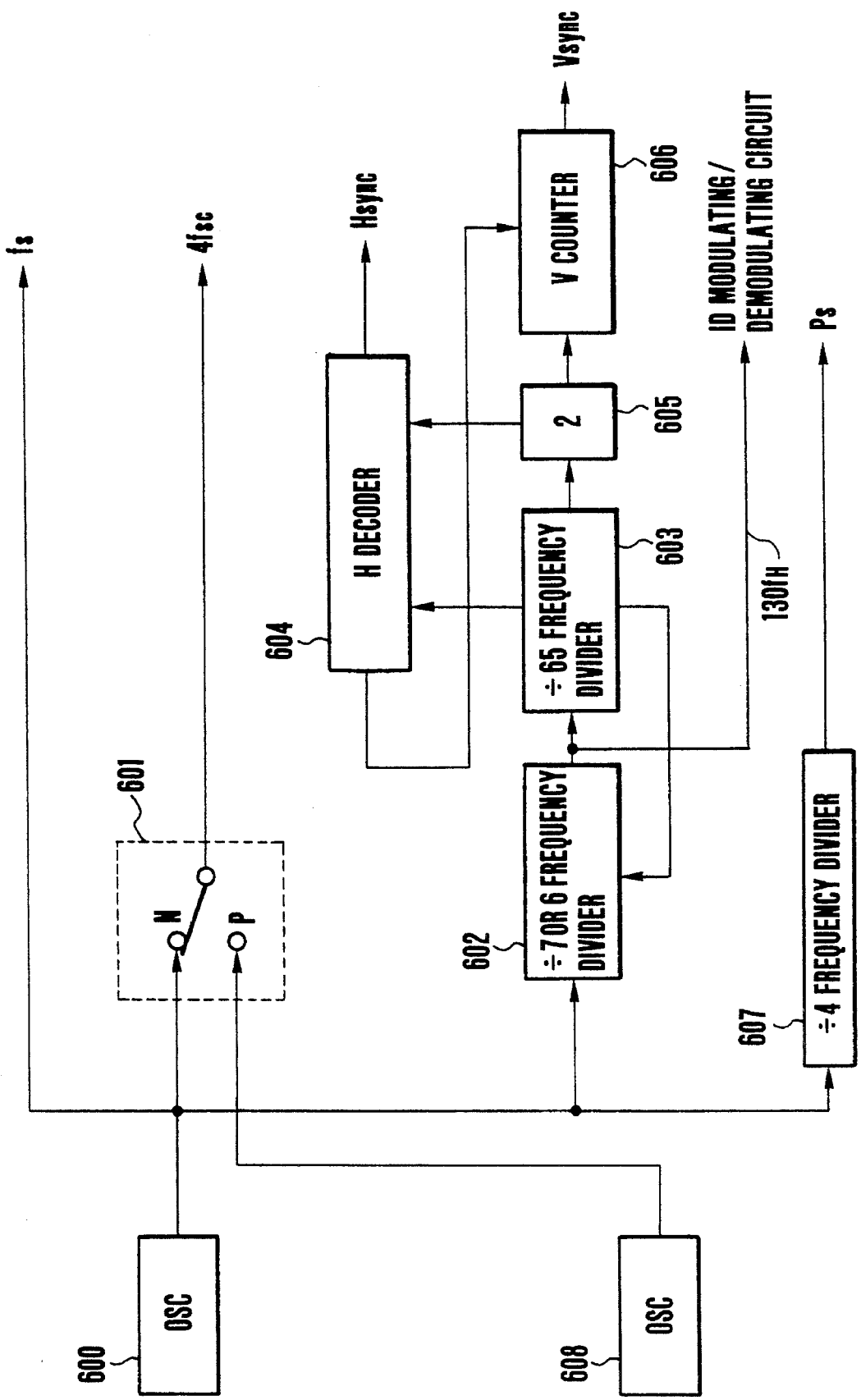
FIG. 17 is a block diagram showing in detail the construction of a timing generator provided in the signal processing device shown in FIG. 16.
Figure 18:
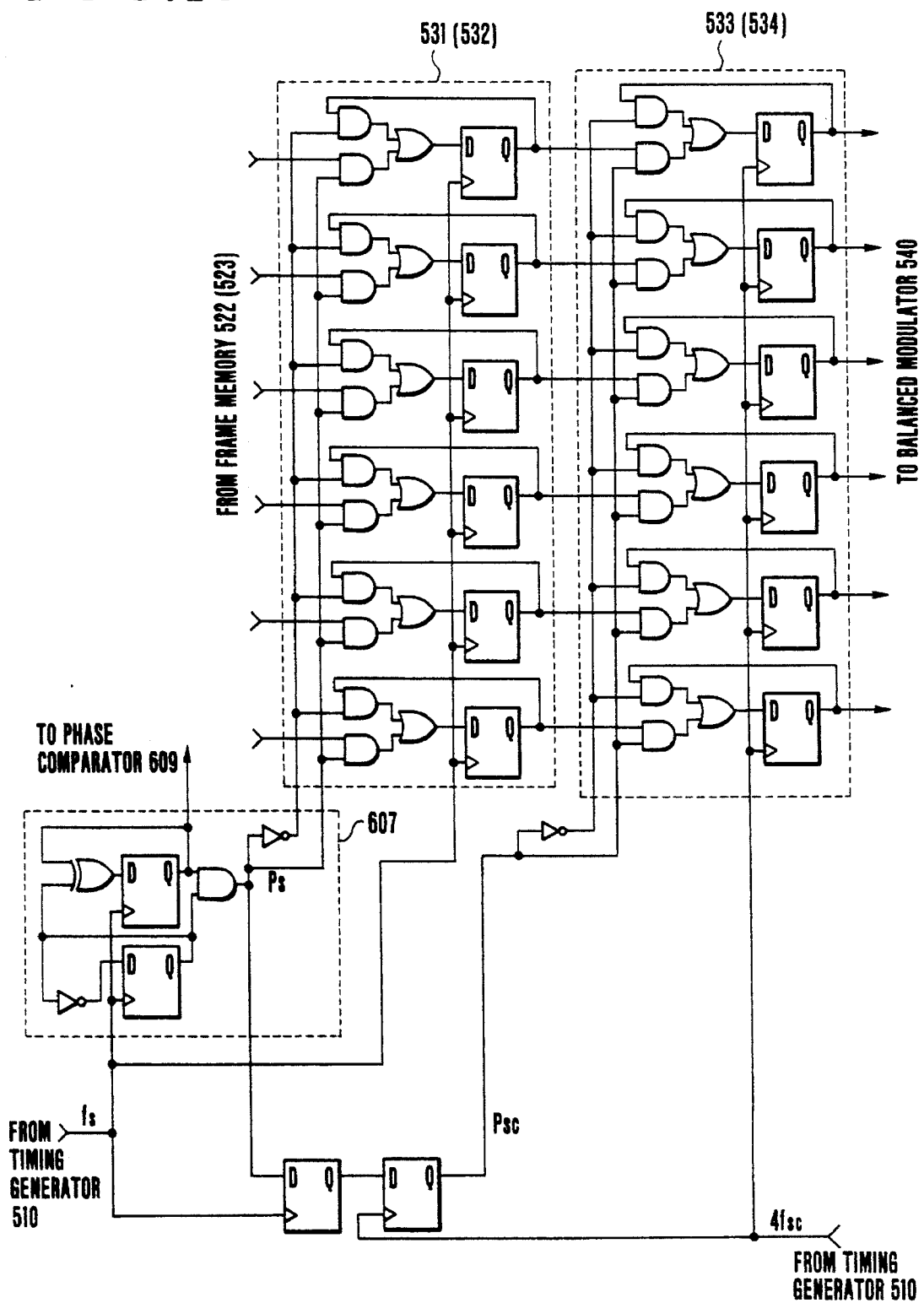
FIG. 18 is a block diagram showing in detail the constructions of shift registers provided in the signal processing device shown in FIG. 16.
Figure 19:
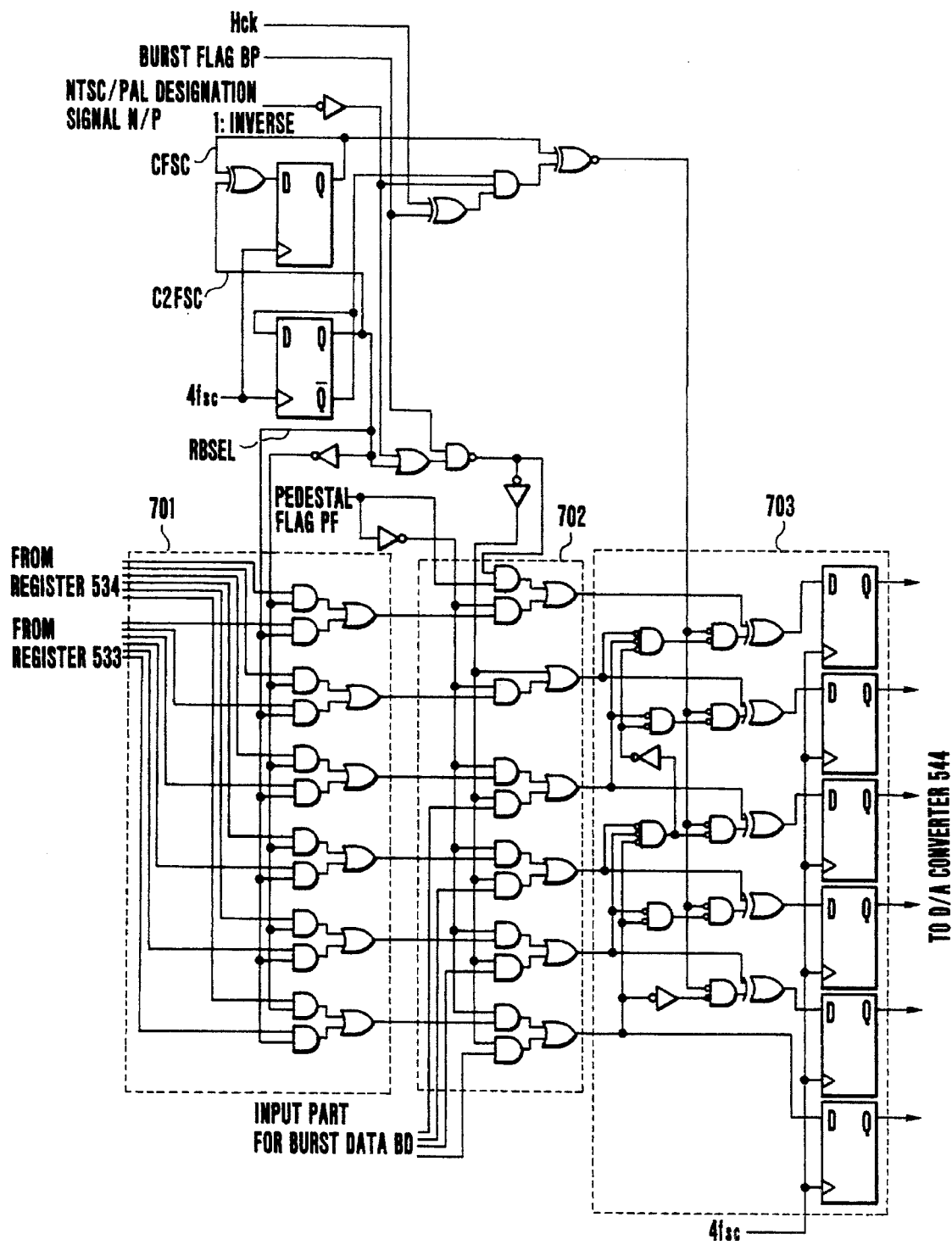
FIG. 19 is a block diagram showing in detail the construction of a balanced modulator provided in the signal processing device shown in FIG. 16.
Figure 20:
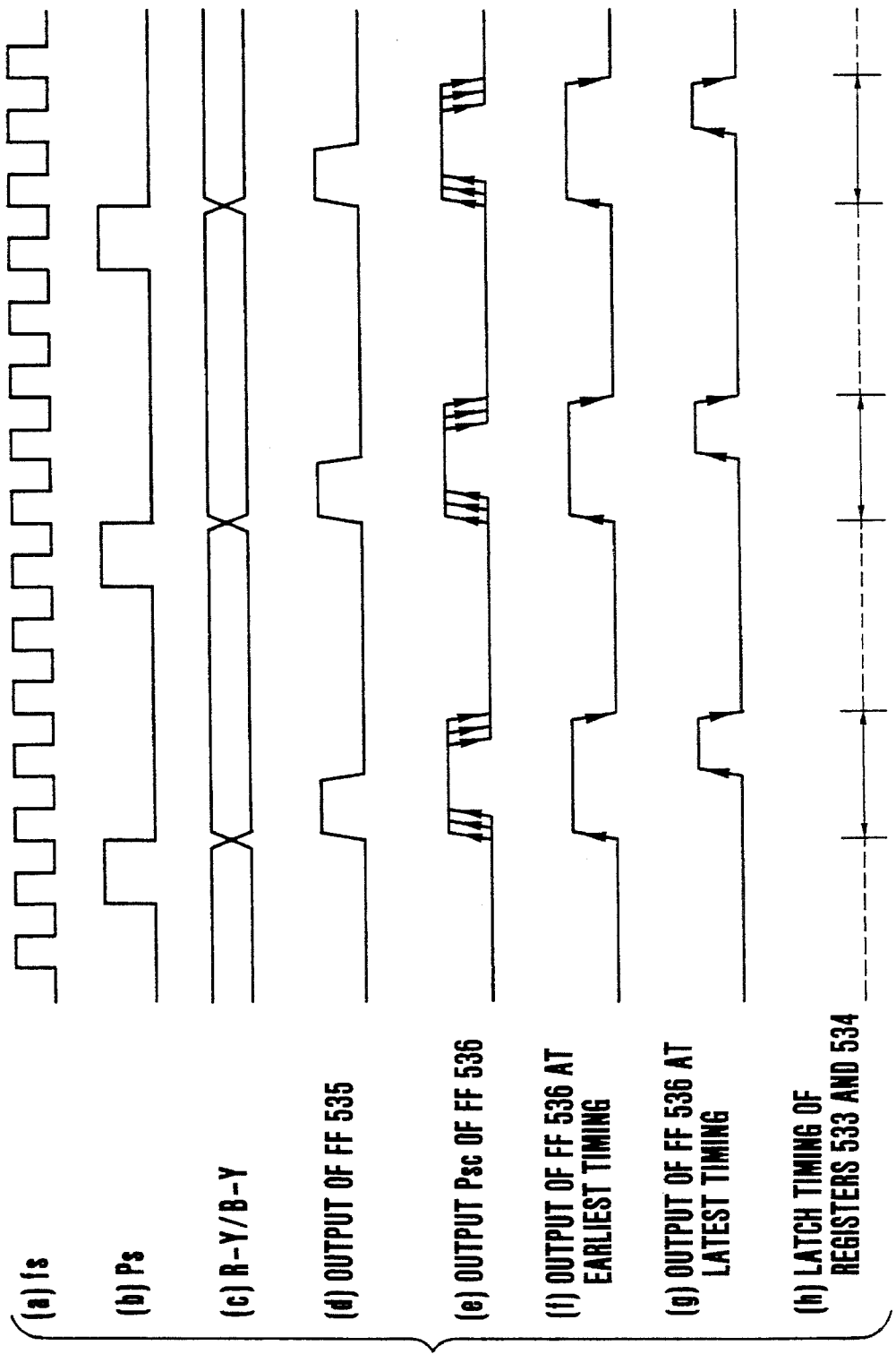
FIG. 20 is a timing chart showing the operating timing of each part of the signal processing device shown in FIG. 16.
Figure 21:
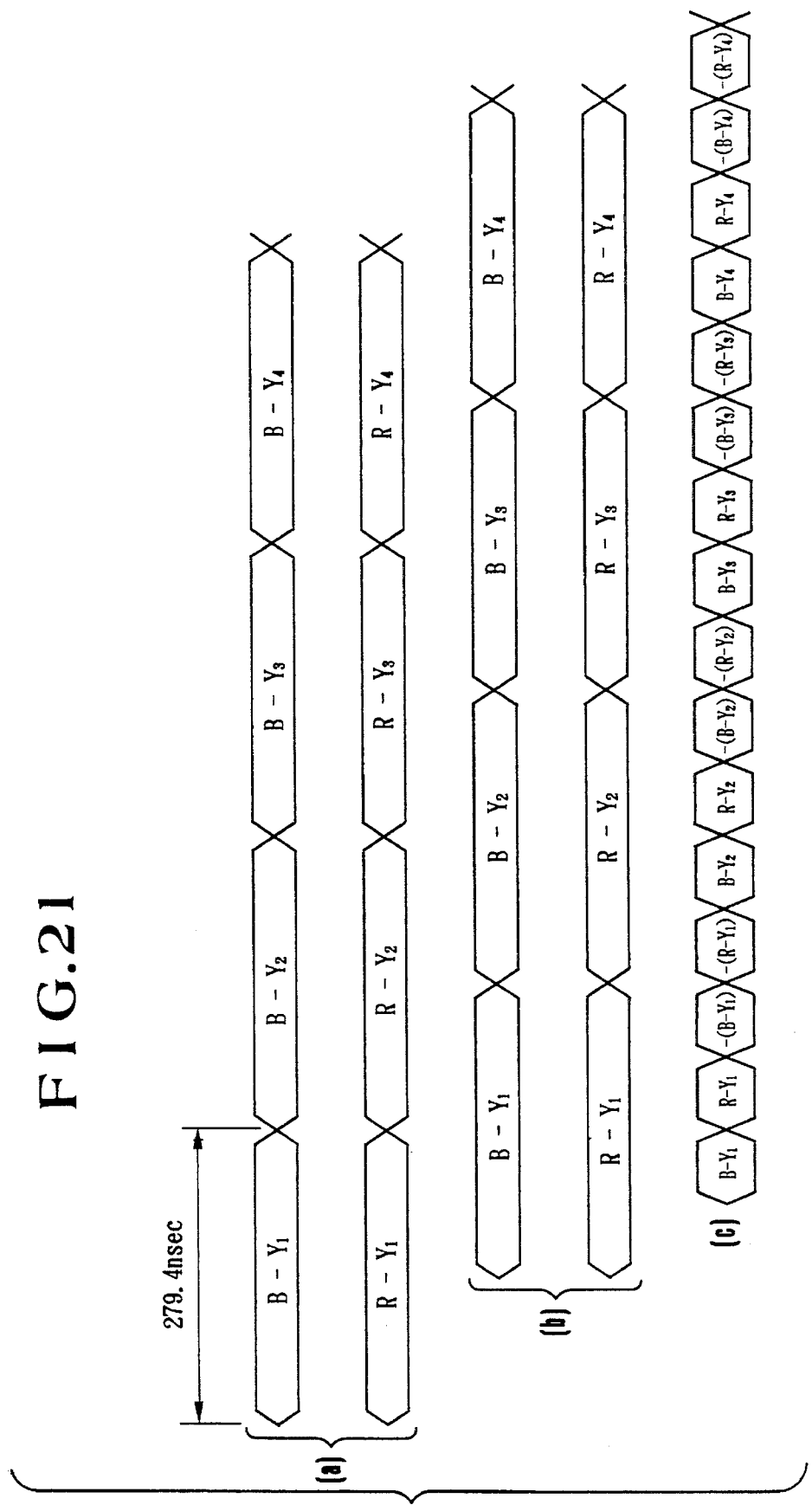
FIG. 21 is a timing chart aiding in explaining an operation which is performed by the signal processing device of FIG. 16 to form a video signal corresponding to the NTSC television system.
Figure 22:
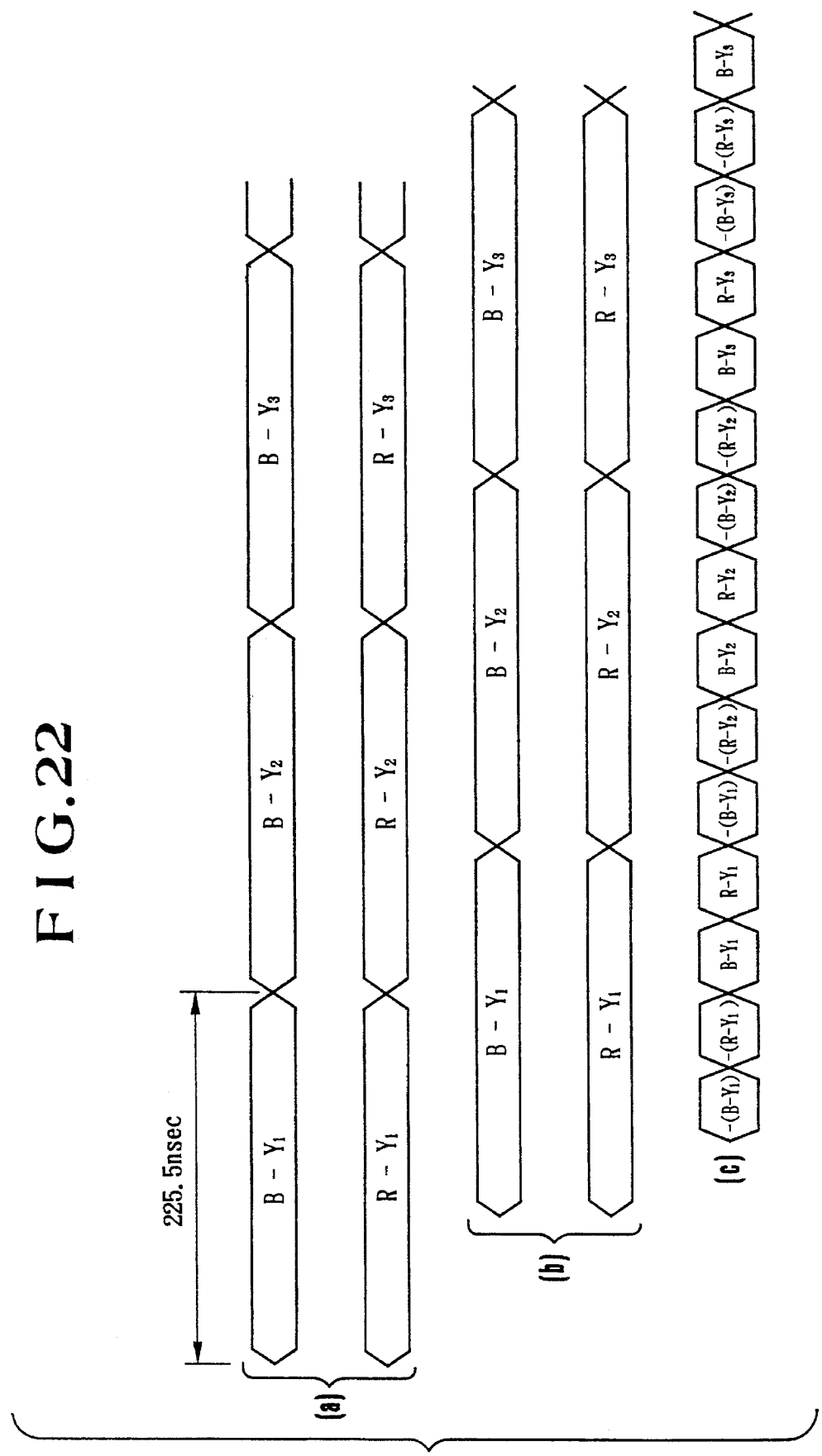
FIG. 22 is a timing chart aiding in explaining an operation which is performed by the signal processing device of FIG. 16 to form a video signal corresponding to the PAL television system.
Figure 23:
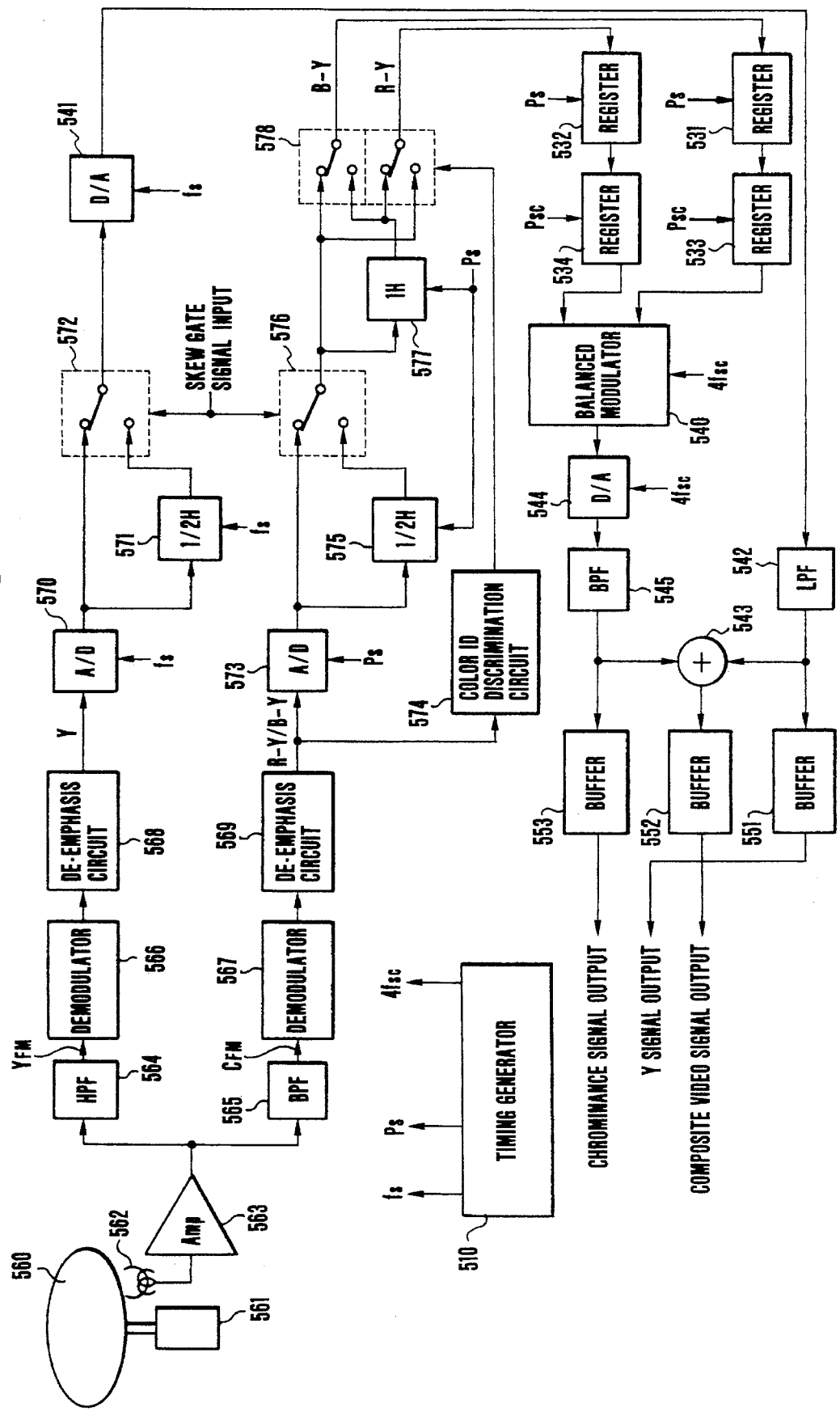
FIG. 23 is a block diagram showing one example of the construction of an electronic still video reproducing apparatus to which the signal processing device shown in FIG. 16 is applied.

A fourth embodiment of the present invention will be described below with reference to FIGS. 16 through 23. FIG. 16 is a block diagram showing a signal processing device according to the fourth embodiment of the present invention. FIG. 17 is a block diagram showing in detail the construction of a timing generator provided in the signal processing device shown in FIG. 16. FIG. 18 is a block diagram showing in detail the constructions of shift registers provided in the signal processing device shown in FIG. 16. FIG. 19 is a block diagram showing in detail the construction of a balanced modulator provided in the signal processing device shown in FIG. 16. FIG. 20 is a timing chart showing the operating timing of each part of the signal processing device shown in FIG. 16. FIG. 21 is a timing chart aiding in explaining an operation which is performed by the signal processing device of FIG. 16 to form a video signal corresponding to the NTSC television system. FIG. 22 is a timing chart aiding in explaining an operation which is performed by the signal processing device of FIG. 16 to form a video signal corresponding to the PAL television system. FIG. 23 is a block diagram showing one example of the construction of an electronic still video reproducing apparatus to which the signal processing device shown in FIG. 16 is applied.

As is known to those skilled in the art, the color subcarrier frequency fsc is 3.579545 MHz in the case of the NTSC television system or 4.43361875 MHz in the case of the PAL television system. In the signal processing device according to the fourth embodiment, it is assumed that, as the sampling frequency fs for the Y signal and the color-difference signals R-Y and B-Y, 4 fsc (=14.31818 MHz≈ 14.3 MHz) is employed in the case of the NTSC television system, while 16 fsc/5 (=14.18758 MHz≈14.2 MHz) is employed in the case of the PAL television system. It is also assumed that, as the frequency signal 4 fsc for balanced modulation, 4 fsc (=14.31818 MHz≈14.3 MHz) is employed in the case of the NTSC television system, while 4 fsc (=17.73447 MHz≈ 17.7 MHz) is employed in the case of the PAL television system.

As shown in FIG. 16, a timing generator 510 generates the sampling frequency signal fs for the Y signal, the sampling frequency signal fs for the color-difference signals R-Y and B-Y, a sample-and-hold pulse Ps, and the frequency signal 4 fsc for balanced modulation.

The sample-and-hold pulse Ps is a pulse which is generated at the rate of one pulse for every four periods of the sampling frequency signal fs shown in Part (a) of FIG. 20 in the case of either Of the NTSC and PAL television systems, as shown in Part (b) of FIG. 20.

Referring to FIG. 16, the Y signal is converted into a digital signal by an A/D converter 511 which operates in accordance with the sampling frequency signal fs, and the digital signal is stored in a frame memory 521.

More specifically, if the signal processing device of FIG. 16 is to be operated in accordance with the NTSC television system, the Y signal is digitized by using the sampling frequency signal fs (=14.3 MHz), while if the signal processing device of FIG. 16 is to be operated in accordance with the PAL television system, the Y signal is digitized by using the sampling frequency signal fs (=14.2 MHz). The thus-obtained digital signal is stored in the frame memory 521.

The digital Y signal stored in the frame memory 521 is read out and converted into an analog signal by a D/A converter 541 which operates in accordance with the sampling frequency signal fs. The analog signal is applied to a low-pass filter 542, and a signal passed through the low-pass filter 542 is supplied to an adder 543 and to a buffer 551. The signal supplied to the buffer 551 is outputted as a Y signal.

In the meantime, the color-difference signals R-Y and B-Y are respectively converted into digital signals by A/D converters 512 and 513 which operate in accordance with the sampling frequency signal fs. The digital signals outputted from the A/D converters 512 and 513 are stored into associated frame memories 522 and 523.

More specifically, if the signal processing device of FIG. 16 is to be operated in accordance with the NTSC television system, the color-difference signals R-Y and B-Y are digitized by using the sampling frequency signal fs (=14.3 MHz), while if the signal processing device is to be operated in accordance with the PAL television system, the color-difference signals R-Y and B-Y are digitized by using the sampling frequency signal fs (=14.2 MHz). The thus-obtained digital signals are respectively stored in the frame memories 522 and 523.

The digital color-difference signals R-Y and B-Y stored in the respective frame memories 522 and 523 are read out and latched in accordance with the sample-and-hold pulse Ps in associated registers 531 and 532 which operate in synchronism with the sampling frequency signal fs as shown in Part (c) of FIG. 20. The signals outputted from the respective registers 531 and 532 are supplied to registers 533 and 534 which operate in accordance with the frequency signal 4 fsc generated from the timing generator 510.

The sample-and-hold pulse Ps which is supplied to the registers 533 and 534 is formed by sampling the sample-and-hold pulse Ps in a flip-flop (FF) 535 in synchronism with the sampling frequency signal fs to form a signal (refer to Part (d) of FIG. 20) and sampling the aforesaid signal in an FF 536 in synchronism with the frequency signal 4 fsc generated from the timing generator 510. In the registers 533 and 534, the digital color-difference signals R-Y and B-Y supplied from the respective registers 531 and 532 are latched in accordance with the sample-and-hold pulse Psc as described above.

The digital color-difference signals R-Y and B-Y outputted from the respective registers 533 and 534 are balanced-modulated by a digital balanced modulator 540 which operates in synchronism with the frequency signal 4 fsc generated from the timing generator 510, thereby forming a digital chrominance signal. The digital chrominance signal is converted into an analog signal by a D/A converter 544 and the analog signal is applied to a band-pass filter 545, and a signal passed through the band-pass filter 545 is supplied to the adder 543 and to a buffer 553. The signal supplied to the buffer 553 is outputted as a chrominance signal. The adder 543 adds the Y signal to the supplied chrominance signal, and the resultant signal is outputted from a buffer 552 as a composite video signal.

The construction of the timing generator 510 provided in the signal processing device shown in FIG. 16 will be described below in detail with reference to FIG. 17. The oscillator (OSC) 600 shown in FIG. 17 is arranged to be able to selectively output the sampling frequency signal fs, that is, to selectively output the sampling frequency signal fs (=4 fsc=14.31818 MHz) which is needed when the signal processing device shown in FIG. 16 is to be operated in accordance with the NTSC television system and the sampling frequency signal fs (=16 fsc/5=14.18758 MHz) which is needed when the signal processing device shown in FIG. 16 is to be operated in accordance with the PAL television system.

Regarding the frequency signal 4 fsc for balanced modulation, in the case of the NTSC television system, since 4 fsc=fs, the sampling frequency signal fs generated from the OSC 600 is supplied to fan input terminal N of a switch 601 as the frequency signal 4 fsc (14.31818 MHz≈14.3 MHz). In the case of the PAL television system, the sampling frequency signal 4 fsc (17.73447 MHz≈17.7 MHz) generated from an OSC 608 is supplied to an input terminal P of the switch 601. If the signal processing device shown in FIG. 16 is to be operated in accordance with the NTSC television system, the input terminal N of the switch 601 is selected, while if the signal processing device shown in FIG. 16 is to be operated in accordance with the PAL television system, the input terminal P of the switch 601 is selected. In this manner, the switch 601 is capable of performing a selective outputting operation.

If the signal processing device shown in FIG. 16 is to be operated in accordance with the NTSC television system, the sampling frequency signal fs (=4 fsc=14.31818 MHz) corresponding to the NTSC television system is generated from the OSC 600 and is outputted to the A/D converters 511, 512 and 513, the frame memories 521, 522 and 523, the registers 531 and 532, the FF 535 as well as the D/A converter 541 (refer to FIG. 16). The switch 601 is switched to the input terminal N so that the sampling frequency signal fs generated from the OSC 600 is outputted as the frequency signal 4 fs for operating the registers 533 and 534, the FF 536, the digital balanced modulator 540 and the D/A converter 544. If the signal processing device shown in FIG. 16 is to be operated in accordance with the PAL television system, the sampling frequency signal fs (=16 fsc/5= 14.18758 MHz) corresponding to the PAL television system is generated from the OSC 600 and is outputted to the A/D converters 511, 512 and 513, the frame memories 521, 522 and 523, the registers 531 and 532, the FF 535 as well as the D/A converter 541. The switch 601 is switched to the input terminal P so that the sampling frequency signal 4 fsc generated from the OSC 608 is outputted to the registers 533 and 534, the FF 536, the digital balanced modulator 540 and the D/A converter 544.

The frequency of the sampling frequency signal fs outputted from the OSC 600 is divided by four by a ÷4 frequency divider 607, and the resultant frequency signal is supplied, as the sample-and-hold pulse Ps, to the frame memories 522 and 523, the registers 531 and 532 and the FF 535 which are shown in FIG. 16.

The frequency of the sampling frequency signal fs outputted from the OSC 600 is also divided by seven or six by a ÷7 or 6 frequency divider 602, and the frequency of the signal outputted from the ÷7 or 6 frequency divider 602 is divided by sixty-five by a ÷65 frequency divider 603. The resultant frequency signal is supplied to an H (horizontal) decoder 604 and to a ×2 multiplier 605.

The signal of frequency divided by sixty-five by the ÷65 frequency divider 603 is multiplied by two in the ×2 multiplier 605. The signal of frequency multiplied by two is supplied to the H decoder 604 and to a V (vertical) counter 606.

The H decoder 604 resets the V counter 606 on the basis of the signal frequency-divided by the ÷65 frequency divider 603 and the signal frequency-multiplied by the ×2 multiplier 605, and also outputs a horizontal synchronizing signal (Hsync). Meanwhile, the V counter 606 outputs a vertical synchronizing signal (Vsync).

The signal (130 fH in FIG. 17) having the frequency divided by seven or six by the ÷7 or 6 frequency divider 602 is also supplied to an ID modulating/demodulating circuit, which is not shown. In the ID modulating/demodulating circuit, the frequency of the supplied signal is divided by five and then by two, thereby forming the ID carrier (13 fH).

The ÷4 frequency divider 607 of FIG. 17 is constructed as shown in FIG. 18. The ÷4 frequency divider 607 divides by four the frequency of the sampling frequency signal fs outputted from the OSC 600, and the resultant signal is outputted to the register 531 (and the register 532) as the sample-and-hold pulse Ps.

The sample-and-hold pulse Ps outputted from the ÷4 frequency divider 607 is sampled by the FF 535 in accordance with the sampling frequency fs and is further sampled by the FF 536 in accordance with the sampling frequency 4 fsc. The resultant signal is outputted from the FF 536 to the register 533 (the register 534) as the sample-and-hold pulse Psc.

Each of the registers 531 and 533 is constructed as shown in FIG. 18, and has 6-bit parallel inputs. The digital R−Y signal stored in the frame memory 522 of FIG. 16 is inputted to the register 531 by 6 bits per sample in parallel, and the input digital R−Y signal is latched by using the sample-and-hold pulse Ps. The signal outputted from the register 531 is inputted to the register 533 by 6 bits in parallel, and the input signal is latched by using the sample-and-hold pulse Psc. The signal outputted from the register 533 is outputted to the digital balanced modulator 540 of FIG. 16 by 6 bits in parallel. Although not shown, the registers 532 and 534 are constructed similarly to the registers 531 and 533. The digital B−Y signal stored in the frame memory 523 of FIG. 16 is inputted to the register 532 by 6 bits per sample in parallel, and the input digital B−Y signal is latched by using the sample-and-hold pulse Ps. The signal outputted from the register 532 is inputted to the register 534 by 6 bits in parallel, and the input signal is shifted by using the sample-and-hold pulse Psc. The signal outputted from the register 534 is outputted to the digital balanced modulator 540 of FIG. 16 by 6 bits in parallel.

The digital balanced modulator 540 of FIG. 16 is constructed as shown in FIG. 19, and has a selecting circuit 701 for selecting the digital R−Y signal supplied from the registers 533 of FIG. 16 or the digital B−Y signal supplied from the register 534 of FIG. 16, a burst adding circuit 702 for adding a burst to the signal selected by the selecting circuit 701, a sign inverting circuit 703 for inverting the sign of a signal outputted from the burst adding circuit 702, and so on. The circuits 701 to 703 are connected in 6-bit parallel.

In FIG. 19, symbol "Hck" denotes a clock signal whose phase is inverted at intervals of a 1 H period, symbol "BF"

denotes a burst flag for defining a burst period, symbol "N/P" denotes an NTSC/PAL designation signal for designating the NTSC television system or the PAL television system, symbol "PF" denotes a pedestal flag for defining a pedestal period, and symbol "BD" denotes burst data.

An operation which is performed by the signal processing device to form a chrominance signal corresponding to the NTSC television system will be described below with reference to FIG. 21. As described previously in connection with FIG. 16, the color-difference signals R–Y and B–Y corresponding to the NTSC television system are digitized at the sampling frequency fs (=14.3 MHz) by the respective A/D converters 512 and 513. The digital color-difference signals R–Y and B–Y are stored in the frame memories 522 and 523, respectively. The digital color-difference signals R–Y and B–Y read out from the respective frame memories 522 and 523 are supplied to the associated registers 531 and 532 at intervals of a period of 279.4 nsec, as shown in Part (a) of FIG. 21.

The digital color-difference signals R–Y and B–Y supplied from the respective registers 522 and 523 are latched by the registers 531 and 532 in accordance with the sample-and-hold pulse Ps, and are further latched by the registers 533 and 534 in accordance with the sample-and-hold pulse Psc. Thus, the digital color-difference signals R–Y and B–Y are delayed as shown in Part (b) of FIG. 21 and supplied to the digital balanced modulator 540.

It is to be noted that the sample-and-hold pulse Psc for controlling the operation of each of the registers 533 and 534 is generated from the FF 536 at an intermediate timing between the earliest timing shown in Part (f) of FIG. 20 and the latest timing shown in Part (g) of FIG. 20.

More specifically, the sample-and-hold pulse Psc is generated from the FF 536 within each time interval such as that shown in Part (h) of FIG. 20. In each time interval, since the FF 536 generates the sample-and-hold pulse Psc in synchronism with the frequency signal 4 fsc (=fs=14.31818 MHz) corresponding to the NTSC television system, the registers 533 and 534 latch the digital color-difference signals R–Y and B–Y supplied from the respective registers 531 and 532, at timing synchronized with the frequency signal 4 fsc (in this example, 14.31818 MHz) which is an operating clock signal for the rear-stage digital balanced modulator 540.

The digital color-difference signals R–Y and B–Y supplied from the respective registers 533 and 534 are balanced-modulated by the digital balanced modulator 540 as shown in Part (c) of FIG. 21 so that signals the signs of which are alternately inverted like (B–Y), (R–Y), –(B–Y), –(R–Y) . . . are formed and outputted.

An operation which is performed by the signal processing device to form a chrominance signal corresponding to the PAL television system will be described below with reference to FIG. 22.

As described previously in connection with FIG. 16, the color-difference signals R–Y and B–Y corresponding to the PAL television system are digitized at the sampling frequency fs (=14.2 MHz) by the respective A/D converters 512 and 513. The digital color-difference signals R–Y and B–Y are stored in the frame memories 522 and 523, respectively. The digital color-difference signals R–Y and B–Y read out from the respective frame memories 522 and 523 are supplied to the associated registers 531 and 532 at intervals of a period of 225.5 nsec.

The digital color-difference signals R–Y and B–Y supplied from the respective frame memories 522 and 523 are latched by the associated registers 531 and 532 in accordance with the sample-and-hold pulse Ps, and are further latched by the respective registers 533 and 534 in accordance with the sample-and-hold pulse Psc. Thus, the digital color-difference signals R–Y and B–Y are delayed as shown in Part (b) of FIG. 22 and supplied to the digital balanced modulator 540.

It is to be noted that the sample-and-hold pulse Psc for controlling the operation of each of the registers 533 and 534 is generated from the FF 536 at an intermediate timing between the earliest timing shown in Part (f) of FIG. 20 and the latest timing shown in Part (g) of FIG. 20.

More specifically, the sample-and-hold pulse Psc is generated from the FF 536 within each time interval such as that shown in Part (h) of FIG. 20. In each time interval, since the FF 536 generates the sample-and-hold pulse Psc in synchronism with the frequency signal 4 fsc (=17.73447 MHz) corresponding to the PAL television system, the registers 533 and 534 latch the digital color-difference signals R–Y and B–Y supplied from the respective registers 531 and 532, at timing synchronized with the frequency signal 4 fsc (in this example, 17.73447 MHz) which is an operating clock signal for the rear-stage digital balanced modulator 540.

The digital color-difference signals R–Y and B–Y supplied from the respective registers 533 and 534 are balanced-modulated by the digital balanced modulator 540 as shown in Part (c) of FIG. 22 so that signals the signs of which are alternately inverted like –(B–Y), –(R–Y), (B–Y), (R–Y), . . . are formed and outputted.

As described above, the latching timing of each of the registers 533 and 534 depends on the operating clock frequency of the rear-stage digital balanced modulator 540 (that is, 14.31818 MHz in the case of the NTSC television system or 17.73447 MHz in the case of the PAL television system). The registers 533 and 534 are arranged to start their latching operations after the latching operations of the front-stage registers 531 and 532 are completed and the states of data in them are established.

As is apparent from the above description, in the above-described fourth embodiment, the digital color-difference signals formed by sampling performed in accordance with the sampling frequency signal fs generated from the OSC 600 are latched by the respective registers 533 and 534 in accordance with the sample-and-hold pulse Psc generated from the FF 536, whereby re-sampling of the digital color difference signals is performed. Accordingly, the digital color-difference signals can be inputted into a digital balanced modulator at an optimum timing, whether the digital balanced modulator conforms to the NTSC television system or the PAL television system both of which operate in accordance with clock signals of different frequencies. By performing the above-described digital processing, it is possible to encode the digital color-difference signals into a chrominance signal without converting the digital color-difference signals into analog signals.

In addition, since the above-described circuits may be integrated into one IC chip together with other digital circuits, it is possible to realize a highly reliable circuit which is insusceptible to temperature variations or the like.

FIG. 23 is a block diagram showing one example of the construction of an electronic still video reproducing apparatus to which the signal processing device shown in FIG. 16 is applied.

In FIG. 23, the frame memories 521, 522 and 523 shown in FIG. 16 are omitted and the same reference numerals are used to denote elements similar to those shown in FIG. 16. Referring to FIG. 23, a video floppy disc 560 loaded in the apparatus is rotated at a predetermined rotational speed by a spindle motor 561, and a video signal recorded on the video floppy disc 560 is reproduced by a head 562. The reproduced video signal is amplified by an amplifier 563, and a luminance signal component YFM and a chrominance signal component CFM are extracted from the amplified video signal by a high-pass filter (HPF) 564 and a band-pass filter (BPF) 565, respectively.

The luminance signal component YFM and the chrominance signal component CFM are respectively frequency-demodulated by demodulators 566 and 567, and the signals outputted from the respective demodulators 566 and 567 are subjected to de-emphasis processing in associated de-emphasis circuits 568 and 569. Thus, a luminance signal Y and a color-difference line-sequential signal R–Y/B–Y are restored.

As described previously in connection with FIG. 16, the luminance signal Y is digitized by the A/D converter 570 by using the sampling frequency signal fs, and the digital luminance signal Y is supplied to a skew gate switch 572 as a non-delayed signal and a signal delayed by ½ H by a ½ H delay line 571. The skew gate switch 572 is switched at intervals of one field period in accordance with a skew gate signal, whereby skew compensation is effected. The signal outputted from the skew gate switch 572 is converted into an analog signal by a D/A converter 541, and the analog signal is outputted from the D/A converter 541.

In the meantime, the color-difference line-sequential signal R–Y/B–Y is digitized by an A/D converter 573. The color-difference line-sequential signal R–Y/B–Y digitized by the A/D converter 573 is supplied to a skew gate switch 576 as a non-delayed signal and a signal delayed by ½ H by a ½ H delay line 575. The skew gate switch 576 is switched at intervals of one field period in accordance with the skew gate signal, whereby skew compensation is effected. The signal outputted from the skew gate switch 576 is supplied to a gate switch 578 as a non-delayed signal and a signal delayed by 1 H by a 1 H delay line 577. The non-delayed signal and the 1 H delayed signal are converted into simultaneous signals by switching the gate switch 578 in accordance with a discrimination signal outputted from a color-ID discrimination circuit 574, and the gate switch 578 outputs digital R–Y and B–Y signals. The digital R–Y and B–Y signals are supplied to the respective registers 232 and 231.

Thereafter, a Y signal, a chrominance signal and a composite video signal are formed and outputted as described previously in connection with FIG. 16.

In the embodiment shown in FIG. 23, the ½ H delay line 571 is arranged to operate in accordance with the sampling frequency signal fs outputted from the timing generating circuit 510 shown in FIG. 16, and the ½ H delay line 575 and the 1 H delay line 577 are arranged to operate in accordance with the sample-and-hold pulse Ps outputted from the timing generating circuit 510.

As is apparent from the above description, according to the fourth embodiment, it is possible to provide a signal processing device capable of forming video signals of various kinds corresponding to a plurality of kinds of television systems by means of a simple construction.

What is claimed is:

1. An image signal processing device for processing an image signal, comprising:

(A) digital data outputting means for receiving digital data corresponding to sequential color-difference signals in which two kinds of color difference signals appear alternately in synchronism with a clock signal corresponding to a data rate of the digital data to synchronize the received digital data and to output two kinds of digital color-difference data corresponding to the two kinds of color-difference signals;

(B) digital data reconstructing means for reconstructing the two kinds of digital color-difference data outputted by said digital data outputting means into digital data synchronized with a clock signal having a frequency which is an integer multiple of a color subcarrier frequency, and outputting the reconstructed digital data; and (C) digital data forming means for forming digital data corresponding to a chrominance signal by using the reconstructed digital data corresponding to the two kinds of color difference signals outputted from said digital data reconstructing means.

2. An image signal processing device according to claim 1, wherein the digital data corresponding to the sequential color-difference signals include dot-sequential digital color-difference signals which include dot-sequential sequential color-difference data in which two kinds of digital color-difference data alternately appear in synchronism with the clock signal corresponding to the data rate of the digital data.

3. An image signal processing device according to claim 2, wherein said digital data outputting means includes a simultaneous conversion circuit for forming the dot-sequential digital color-difference data by simultaneous conversion.

4. An image signal processing device for processing an image signal, comprising:

(A) a simultaneous conversion circuit for inputting dot-sequential digital color-difference data in which two kinds of digital color-difference data appear alternately in synchronism with a clock corresponding to a data rate of the dot-sequential digital color-difference data and for simultaneously forming the dot-sequential digital color-difference data into two kinds of digital color-difference data by simultaneous conversion;

(B) a data separating circuit for separating each of the two kinds of digital color-difference data outputted from said simultaneous conversion circuit into even-numbered digital data and odd-numbered digital data in synchronism with the clock signal corresponding to the data rate of the dot-sequential digital color-difference data, and outputting the even-numbered digital color-difference data and the odd-numbered digital color-difference data;

(C) a selecting circuit for selecting the digital color-difference data outputted from said data separating circuit in synchronism with clock signal having frequency which is an integer multiple of a color subcarrier frequency, and outputting the selected digital color-difference data; and (D) digital data forming means for forming digital data corresponding to a chrominance signal by using the two kinds of digital color-difference data outputted from said selecting circuit.

5. An image signal processing device according to claim 4, wherein said digital data forming means includes:

(a) a polarity controlling circuit for controlling the polarity of the digital color-difference data outputted from said selecting circuit in synchronism with the clock signal having the frequency which is the integer multiple of the color subcarrier frequency, and outputting the resultant digital color-difference data; and (b) a data outputting circuit for selectively outputting the digital color-difference data outputted from said polarity controlling circuit.

6. An image signal processing device for processing an image signal, comprising:

(A) a simultaneous conversion circuit for forming digital data corresponding to dot-sequential color-difference signal into two kinds of digital color-difference data by simultaneous conversion;

(B) a data separating circuit for separating each of the two kinds of digital color-difference data outputted from said simultaneous conversion circuit into even-numbered digital data and odd-numbered digital data in synchronism with a clock signal corresponding to data rate of the digital data corresponding to the dot-sequential color-difference signal, and outputting the even-numbered digital color-difference data and the odd-numbered digital color-difference data;

(C) digital data reconstructing means for reconstructing the two kinds of color difference data outputted from said data separating circuit into digital data with a clock signal having a frequency which is an integer multiple of a color subcarrier frequency, and outputting the reconstructed digital data; and (D) digital data forming means for forming digital data corresponding to a chrominance signal by using the reconstructed digital data corresponding to the two kinds of color-difference data outputted from the digital data reconstructing means.

7. An image signal processing device according to claim 6, wherein said digital data reconstructing means includes a selecting circuit for selectively outputting the two kinds of digital color-difference data outputted from said data separating circuit in synchronism with the clock signal having the frequency which is the integer multiple of the color subcarrier frequency.

8. An image signal processing device according to claim 7, wherein said digital data forming means includes:

(a) a polarity controlling circuit for controlling the polarity of the digital color-difference data outputted from said selecting circuit in synchronism with the clock signal having the frequency which is the integer multiple of the color subcarrier frequency and outputting the resultant digital color-difference data; and (b) a data outputting circuit for selectively outputting the digital color-difference data outputted from said polarity controlling circuit.

9. An image signal processing device according to claim 6, wherein the clock signal having the frequency which is the integer multiple of the color subcarrier frequency is phase-synchronized with the clock signal corresponding to the data rate of the digital data corresponding to the dot-sequential color-difference signal.

* * * * *

UNITED STATES PATENT AND TRADEMARK OFFICE
CERTIFICATE OF CORRECTION

PATENT NO. : 5,469,218            Page 1 of 2
DATED : November 21, 1995
INVENTOR(S) : Yuji Sakaegi and Eiji Ohara It is certified that error appears in the above-identified patent and that said Letters Patent is hereby corrected as shown below:

Col. 8, line 9, change "priciple" to -- principle --.

Col. 8, line 56, after "frequency" delete -- - --.

Col. 11, line 64, change "$\sim$" to -- $\dot{=}$ --.

Col. 11, line 66, change "$\sim$" to -- $\dot{=}$ --.

Col. 15, line 22, change ",a" to --a--.

Col. 15, line 23, change "System" to -- system --.

Col. 16, line 12, change "Same" to -- same --.

Col. 17, line 49, change "$\sim$" to -- $\dot{=}$ --.

Col. 17, line 54, change "$\sim$" to -- $\dot{=}$ --.

Col. 17, line 55, change "$\sim$" to -- $\dot{=}$ --.

Col. 17, line 65, change "Of" to -- of --.

Col. 19, line 22, change "$\sim$" to -- $\dot{=}$ --.

Col. 19, line 24, change "$\sim$" to -- $\dot{=}$ --.

Col. 24, line 24, delete "sequential", second occurance.

Col. 24, line 54, after "with" insert -- a --.

Col. 24, line 55, before "frequency" insert -- a --.

Col. 25, line 11, after "to" insert -- a --.

UNITED STATES PATENT AND TRADEMARK OFFICE
CERTIFICATE OF CORRECTION

PATENT NO. : 5,469,218

DATED : November 21, 1995

INVENTOR(S) : Yuji Sakaegi and Eiji Ohara

It is certified that error appears in the above-identified patent and that said Letters Patent is hereby corrected as shown below:

Col. 25, line 18, after "to" insert -- a --.

Col. 25, line 25, after "data", second occurance, insert -- synchronized --.

Signed and Sealed this

Twenty-eighth Day of May, 1996

Attest:

BRUCE LEHMAN

Attesting Officer

Commissioner of Patents and Trademarks